United States Patent
Futterer et al.

(10) Patent No.: US 8,498,053 B2
(45) Date of Patent: Jul. 30, 2013

(54) SPATIAL LIGHT MODULATOR USING ELECTROWETTING CELLS

(75) Inventors: Gerald Futterer, Dresden (DE); Stephan Reichelt, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 547 days.

(21) Appl. No.: 12/738,676

(22) PCT Filed: Oct. 17, 2008

(86) PCT No.: PCT/EP2008/064053
§ 371 (c)(1),
(2), (4) Date: Apr. 19, 2010

(87) PCT Pub. No.: WO2009/050274
PCT Pub. Date: Apr. 23, 2009

(65) Prior Publication Data
US 2010/0232000 A1    Sep. 16, 2010

(30) Foreign Application Priority Data

| Oct. 19, 2007 | (GB) | 0720484.5 |
| Jun. 27, 2008 | (GB) | 0811795.4 |
| Jun. 27, 2008 | (GB) | 0811797.0 |
| Jun. 27, 2008 | (GB) | 0811802.8 |
| Jun. 27, 2008 | (GB) | 0811805.1 |

(51) Int. Cl.
*G02B 5/18* (2006.01)
(52) U.S. Cl.
USPC .................................................. 359/573

(58) Field of Classification Search
USPC .................................................. 359/573
See application file for complete search history.

(56) References Cited

U.S. PATENT DOCUMENTS

| 6,239,917 B1 | 5/2001 | Tadic-Galeb et al. |
| 2002/0075452 A1 | 6/2002 | Kessler et al. |
| 2004/0223049 A1 | 11/2004 | Taniguchi et al. |
| 2006/0055994 A1 | 3/2006 | Schwerdtner |
| 2006/0139710 A1 | 6/2006 | Schwerdtner |
| 2006/0139711 A1 | 6/2006 | Leister et al. |
| 2006/0250671 A1 | 11/2006 | Schwerdtner et al. |
| 2008/0007808 A1* | 1/2008 | Ogasawara et al. ............. 359/30 |

FOREIGN PATENT DOCUMENTS

EP    1 666 188 A2    6/2006

OTHER PUBLICATIONS

International Search Report, dated Jul. 3, 2009, and Written Opinion, issued in priority International Application No. PCT/EP2008/064053.

Pavani, K. et al., "Electro-optical switching of liquid crystal diffraction gratings by using surface relief effect in the photopolymer," Optics Communications, vol. 273, pp. 367-369 (Jan. 13, 2007).

(Continued)

*Primary Examiner* — James Jones
(74) *Attorney, Agent, or Firm* — Saul Ewing LLP

(57) ABSTRACT

A spatial light modulator for modulating light field amplitude comprises a surface relief grating adapted to act as a diffractive lens, where a material is used to fill at least one groove of a surface grating structure, such that a controllable refractive index birefringence of the material inside the surface relief grating is controlled by an electric field, which leads to a controllable intensity at a fixed focal point.

19 Claims, 23 Drawing Sheets

OTHER PUBLICATIONS

Jepsen M.L. and Gerritsen, H.J., "High efficiency Liquid-crystal filled diffraction gratings," SPIE Proceedings Practical Holography XI and Holographic Materials III, vol. 3011, pp. 165-176 (Feb. 10, 1997).

Commander et al., "Variable focal length microlenses," Optics Communications, North-Holland Publishing Co., Amsterdam, NL, vol. 177, No. 1-6, pp. 157-170 (Apr. 1, 2000).

Smith et al., "Agile wide-angle beam steering with elecrowetting microprisms," Optics Express, vol. 14, No. 14, pp. 6557-6563 (Jul. 10, 2006).

Beni and Hackwood, Appl. Phys. Lett., 38, 4, pp. 207-209 (1981).

Malacara et al., Interferogram Analysis for Optical Testing, 2nd ed. pp. 360-363 (2005).

* cited by examiner

FIGURE 1
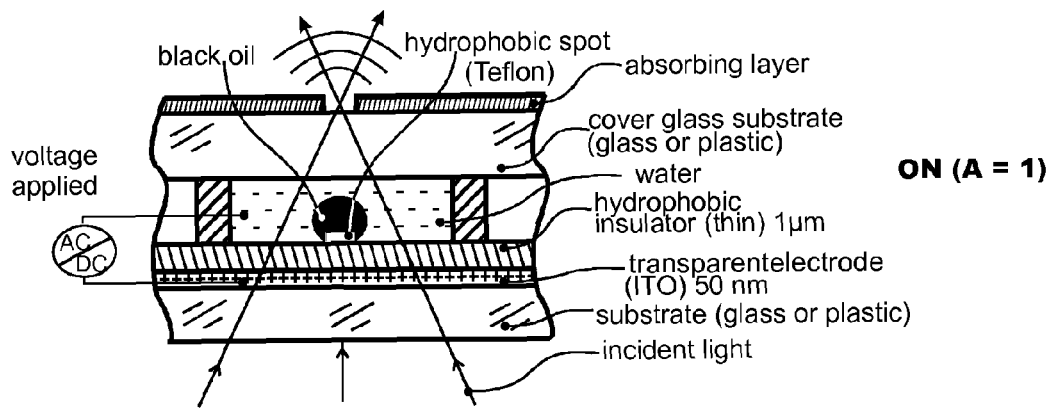
Fig. 1a
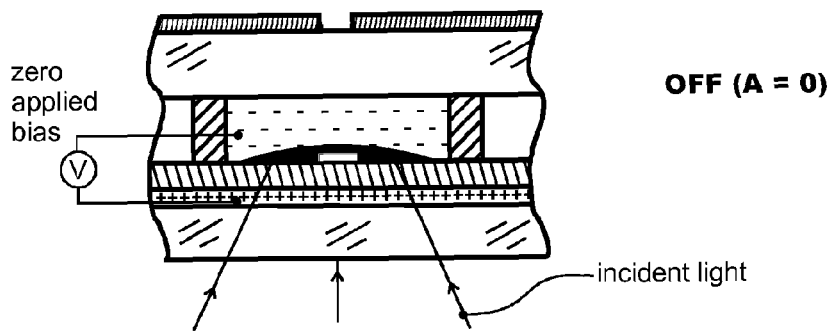
Fig. 1b
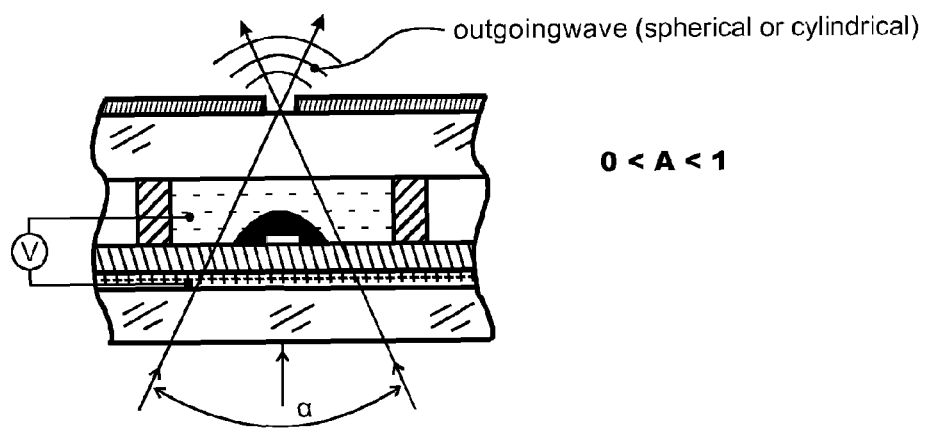
Fig. 1c

FIGURE 2
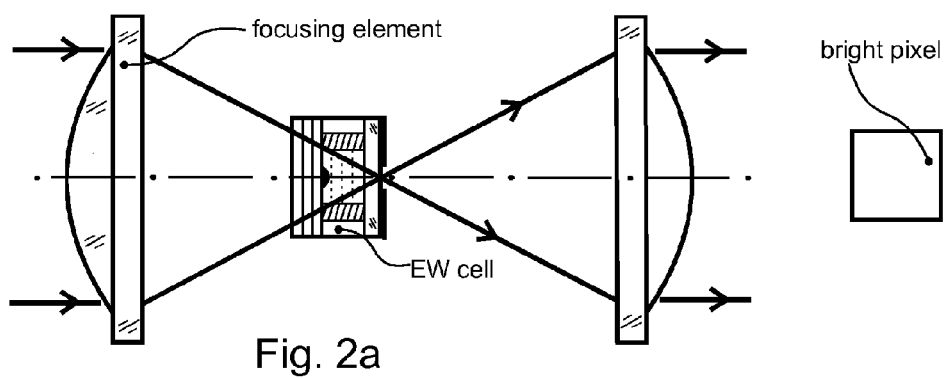
Fig. 2a
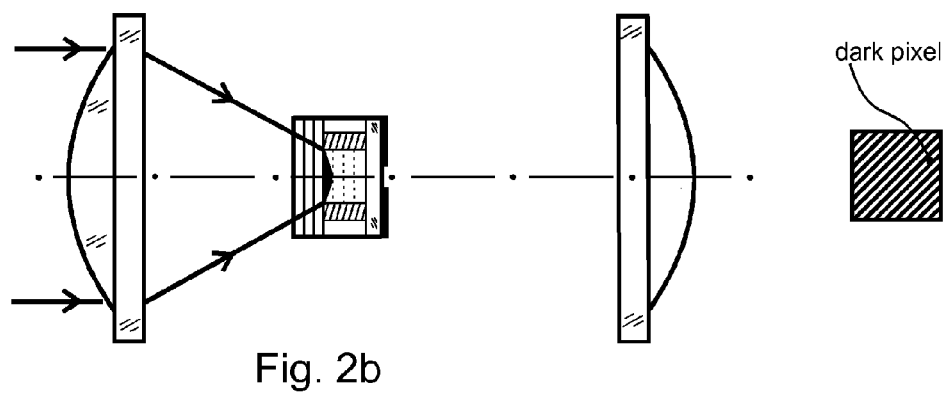
Fig. 2b

FIGURE 3
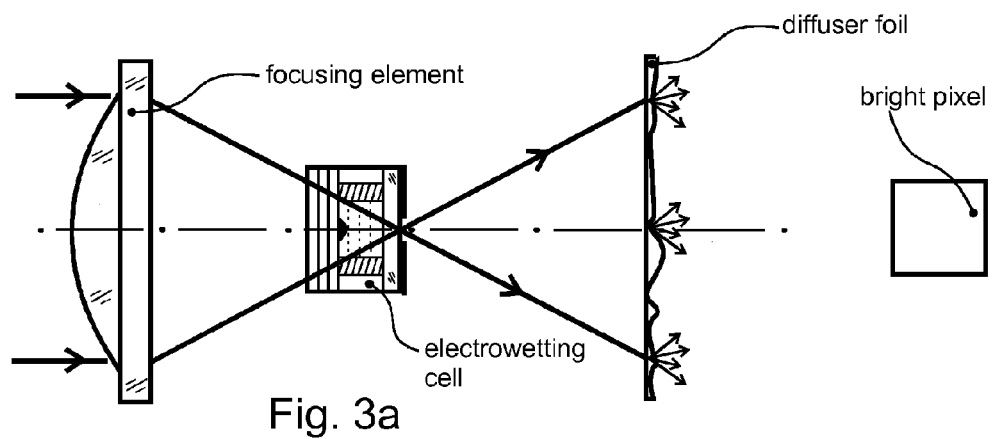
Fig. 3a
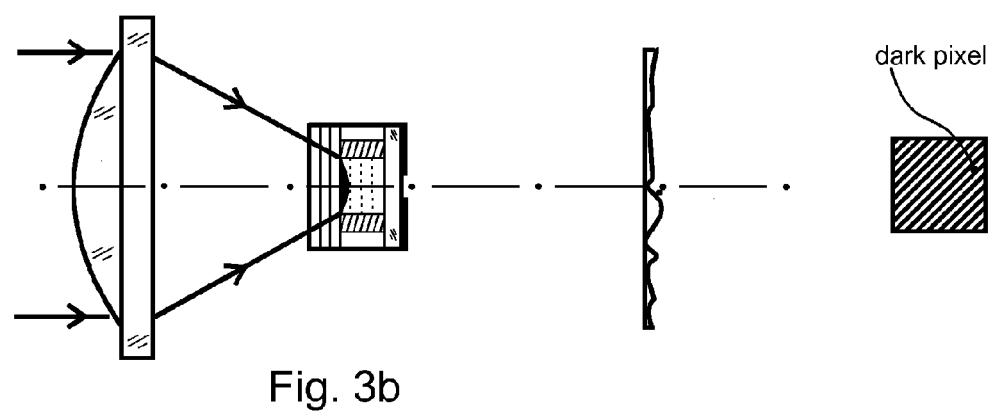
Fig. 3b

FIGURE 4
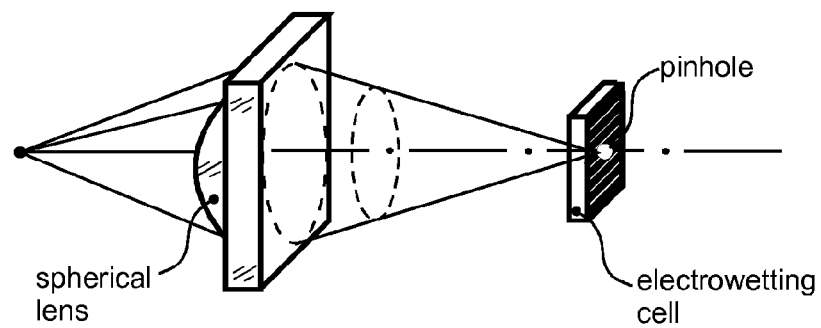
Fig. 4a
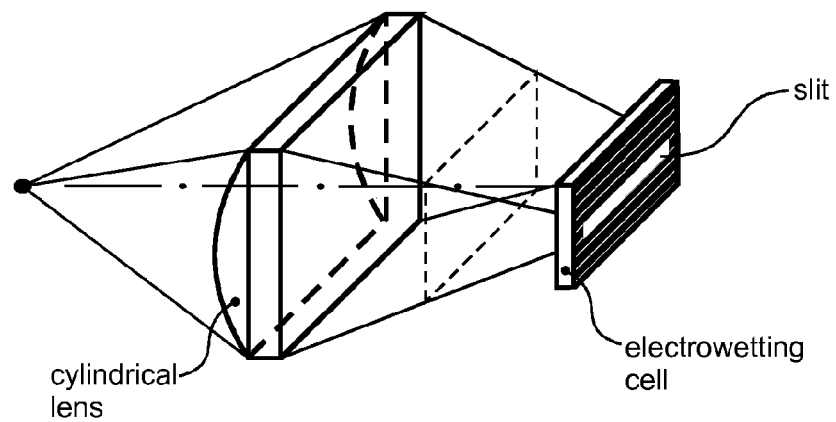
Fig. 4b

FIGURE 5
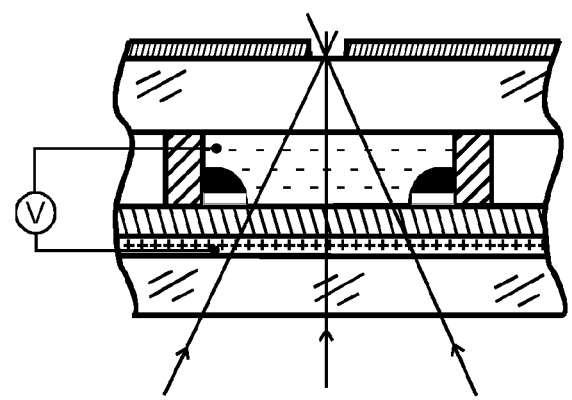
Fig. 5a
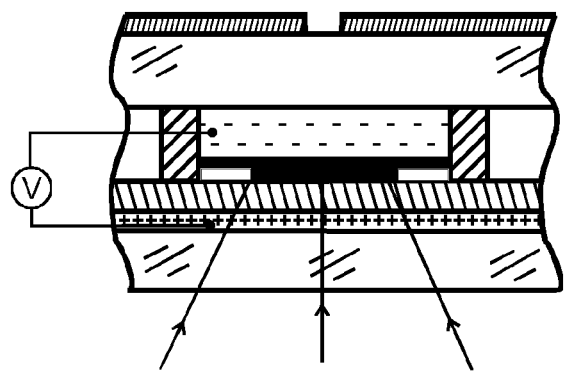
Fig. 5b input wave diffracted wave

Liquid crystal used to fill grooves of surface grating structure

FIGURE 16
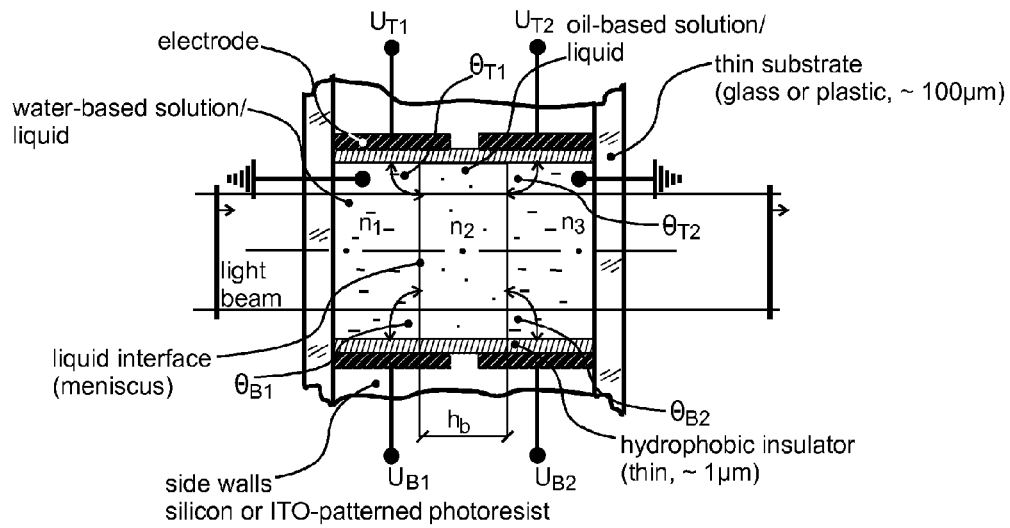
Fig. 16a  initial state:  ΔØ = 0
contact angle:  $\theta_{B1} = \theta_{T1} = \theta_{B2} = \theta_{T2} = 90°$
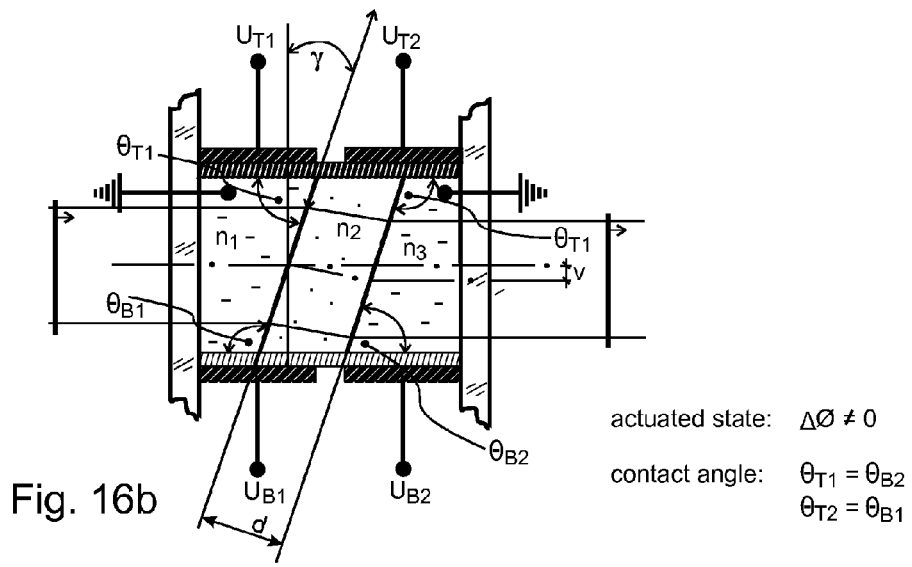
actuated state:  ΔØ ≠ 0
contact angle:  $\theta_{T1} = \theta_{B2}$
$\theta_{T2} = \theta_{B1}$
Fig. 16b

FIGURE 17
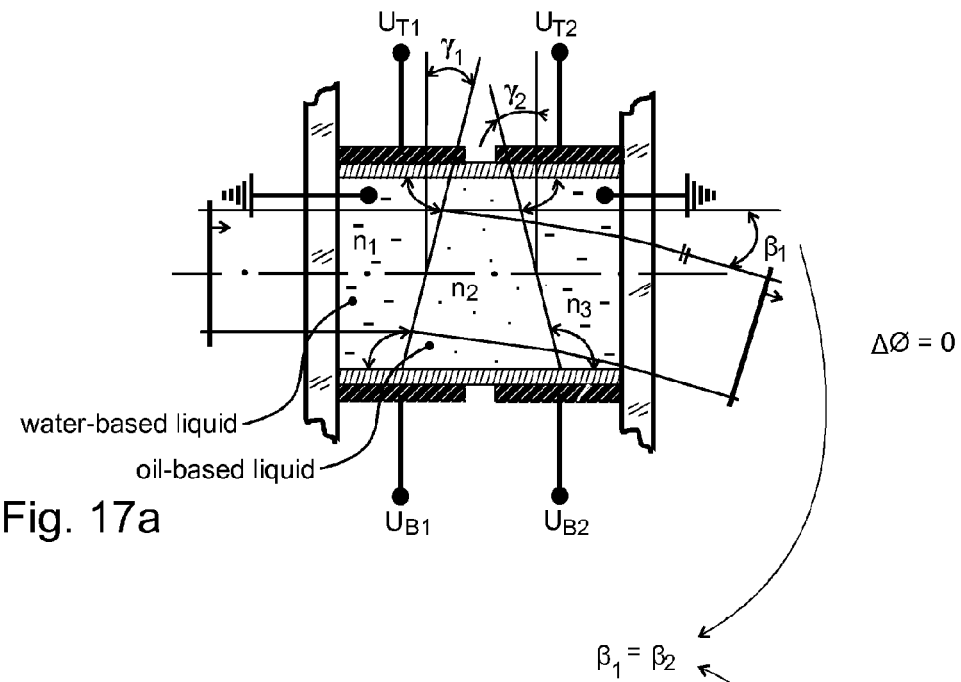
Fig. 17a
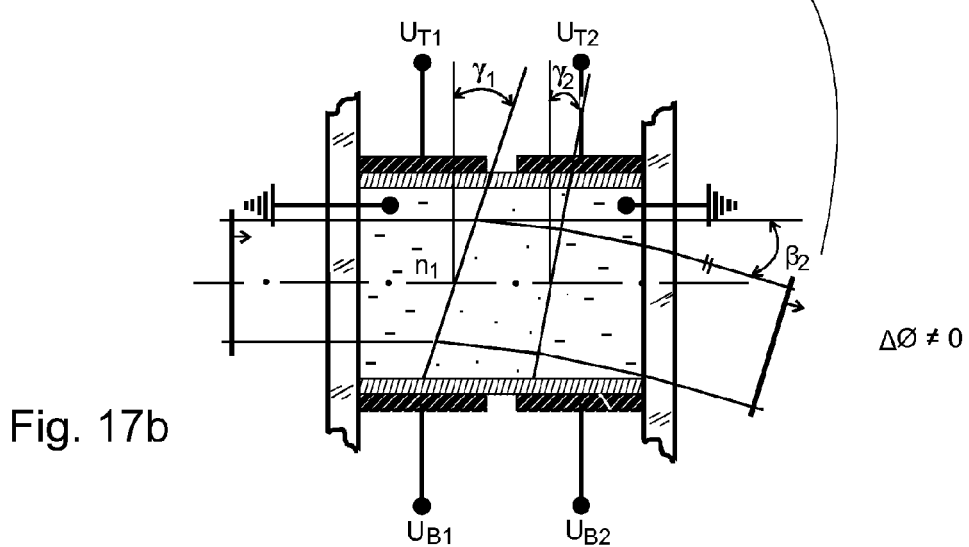
Fig. 17b

SPATIAL LIGHT MODULATOR USING ELECTROWETTING CELLS

CROSS REFERENCE TO RELATED APPLICATIONS

This application claims the priority of PCT/EP2008/064053, filed on Oct. 17, 2008, which claims priority to Great Britain Application Nos. 0720484.5, filed Oct. 19, 2007, 0811795.4, filed Jun. 27, 2008, 0811797.0, filed Jun. 27, 2008, 0811802.8, filed Jun. 27, 2008, and 0811805.1, filed Jun. 27, 2008, the entire contents of which are hereby incorporated in total by reference.

BACKGROUND OF THE INVENTION

1. Field of the Invention

The field of the invention is spatial light modulators, and devices which contain such spatial light modulators, especially holographic display devices.

2. Technical Background

Spatial light modulators (SLMs) are known from the prior art. There are various types of SLMs, based on various physical principles. SLMs are optical devices that modulate an incident light field in a spatial pattern in order to reflect or to transmit an image or to generate a holographic reconstruction corresponding to an electrical or optical input. An SLM typically comprises a one- or two-dimensional array of addressable elements (pixels) which are capable of transmitting or reflecting incident light fields. Well-established examples are liquid crystal (LC) based modulators, in which a voltage-induced birefringence is used to modulate either the amplitude or phase of an incident light field. Spatial light modulators are used in almost all areas of optical technologies and optical information processing which take advantage of variable or adaptive optical components. The applications of spatial light modulators range from display and projection systems, to microscopy, beam and wave front shaping, optical metrology, maskless lithography, ultra-fast laser pulse modulation to aberration correction in terrestrial telescopes.

Various types of SLMs are known from the prior art. These include electrically addressable SLMs (EASLMs), optically addressable SLMs (OASLMs) and magneto-optical SLMs (MOSLMs), for example.

SLMs may comprise an array of pixels. The term "pixel" derives from "picture element" and hence is a term associated with digital imaging. In the context of SLMs, a "pixel" is the hardware element which controls the display of a picture element of an image which may be seen by a viewer. The image seen by a viewer may be a holographic representation of a three-dimensional scene.

Prior art SLMs have various drawbacks. Most of the liquid-crystal-based spatial light modulators which are commercially available today exhibit refresh rates in a range of 60-120 Hz, which correspond to response times greater than 8 milliseconds. Such switching speeds are sufficient for many applications. However, there are many applications which require a much faster switching, i.e. higher frame rates. This includes in particular applications which involve time multiplexing methods. Possible applications of time multiplexing are displays that present different information to different observers. Such displays redirect the light to different observers and simultaneously change the information content of the display designated for each observer. As long as the refresh rate per observer is more than about 60 Hz, i.e. the response time is below 17 ms, the observer does not perceive any flickering of the image displayed. Examples of possible applications are automotive displays, where the driver wishes to see the navigation system whereas another passenger wishes to see a movie. Another example is 3D autostereoscopic displays where every observer wishes to see the 3D scene from their own perspective.

An object of the implementations disclosed in this document is to modulate the amplitude, or the phase, or the amplitude and phase of a light field spatially, where the temporal modulation of the desired values is fast compared with LC-based SLMs. The amplitude is typically adjustable in the entire codomain (from 0 to 1, inclusive), whereas the phase is typically adjustable in the entire codomain (from 0 to $2\pi$, inclusive) and the target refresh rate lies within the range of between some hundred Hertz and some kHz, i.e. a response time of 5 milliseconds or less, but typically greater than or equal to 100 microseconds. A further object of the implementations is to cover the entire amplitude and/or phase range by a relative change of the amplitude and/or phase values between the individual pixels of a plane one- or two-dimensional array.

It will be appreciated by those skilled in the art that the SLMs conforming to this invention may be used in any known application in which SLMs are employed. While the applications of the spatial light modulators described here are not limited to holographic displays, holographic displays are the preferred application of the spatial light modulators described here. It will be appreciated by those skilled in the art that the SLMs described herein may be used in any known form of holographic display. However, the preferred approach of the applicant to generating computer-generated video holograms will be described below.

Computer-generated video holograms (CGHs) are encoded in one or more spatial light modulators (SLMs); the SLMs may include electrically or optically controllable cells. The cells modulate the amplitude and/or phase of light by encoding hologram values corresponding to a video-hologram. The CGH may be calculated e.g. by coherent ray tracing, by simulating the interference between light reflected by the scene and a reference wave, or by Fourier or Fresnel transforms; CGH calculation methods are described for example in US2006/055994 and in US2006/139710, which are incorporated by reference. An ideal SLM would be capable of representing arbitrary complex-valued numbers, i.e. of separately controlling the amplitude and the phase of an incoming light wave. However, a typical SLM controls only one property, either amplitude or phase, with the undesirable side effect of also affecting the other property. There are different ways to spatially modulate the light in amplitude or phase, e.g. electrically addressed liquid crystal SLM, optically addressed liquid crystal SLM, magneto-optical SLM, micro mirror devices or acousto-optic modulators. The modulation of the light may be spatially continuous or composed of individually addressable cells, one-dimensionally or two-dimensionally arranged, binary, multi-level or continuous.

In the present document, the term "encoding" denotes the way in which regions of a spatial light modulator are supplied with control values to encode a hologram so that a 3D-scene can be reconstructed from the SLM.

In contrast to purely auto-stereoscopic displays, with video holograms an observer sees an optical reconstruction of a light wave front of a three-dimensional scene. The 3D-scene is reconstructed in a space that stretches between the eyes of an observer and the spatial light modulator (SLM), or possibly even behind the SLM. The SLM can also be encoded with video holograms such that the observer sees objects of a reconstructed three-dimensional scene in front of the SLM and other objects on or behind the SLM.

The cells of the spatial light modulator may be transmissive cells which are passed through by light, the rays of which are capable of generating interference at least at a defined position and over a spatial coherence length of a few millimetres. This allows holographic reconstruction with an adequate resolution in at least one dimension. This kind of light will be referred to as 'sufficiently coherent light'. However, cells which operate in a reflective geometry are also possible.

In order to ensure sufficient temporal coherence, the spectrum of the light emitted by the light source must be limited to an adequately narrow wavelength range, i.e. it must be near-monochromatic. The spectral bandwidth of high-brightness LEDs is sufficiently narrow to ensure temporal coherence for holographic reconstruction. The diffraction angle at the SLM is proportional to the wavelength, which means that only a monochromatic source will lead to a sharp reconstruction of object points. A broadened spectrum will lead to broadened object points and smeared object reconstructions. The spectrum of a laser source can be regarded as monochromatic. The spectral line width of a LED is sufficiently narrow to facilitate good reconstructions.

Spatial coherence relates to the lateral extent of the light source. Conventional light sources, like LEDs or Cold Cathode Fluorescent Lamps (CCFLs), can also meet these requirements if they radiate light through an adequately narrow aperture. Light from a laser source can be regarded as emanating from a point source within diffraction limits and, depending on the modal purity, leads to a sharp reconstruction of the object, i.e. each object point is reconstructed as a point within diffraction limits.

Light from a spatially incoherent source is laterally extended and causes a smearing of the reconstructed object. The amount of smearing is given by the broadened size of an object point reconstructed at a given position. In order to use a spatially incoherent source for hologram reconstruction, a trade-off has to be found between brightness and limiting the lateral extent of the source with an aperture. The smaller the light source, the better is its spatial coherence.

A line light source can be considered to be a point light source if seen from a right angle to its longitudinal extension. Light waves can thus propagate coherently in that direction, but incoherently in all other directions.

In general, a hologram reconstructs a scene holographically by coherent superposition of waves in the horizontal and the vertical directions. Such a video hologram is called a full-parallax hologram. The reconstructed object can be viewed with motion parallax in the horizontal and the vertical directions, like a real object. However, a large viewing angle requires high resolution in both the horizontal and the vertical direction of the SLM.

Often, the requirements on the SLM are lessened by restriction to a horizontal-parallax-only (HPO) hologram. The holographic reconstruction takes place only in the horizontal direction, whereas there is no holographic reconstruction in the vertical direction. This results in a reconstructed object with horizontal motion parallax. The perspective view does not change upon vertical motion. A HPO hologram requires less resolution of the SLM in the vertical direction than a full-parallax hologram. A vertical-parallax-only (VPO) hologram is also possible but uncommon. The holographic reconstruction occurs only in the vertical direction and results in a reconstructed object with vertical motion parallax. There is no motion parallax in the horizontal direction. The different perspective views for the left eye and right eye have to be created separately.

In some of the implementations described herein, electrowetting cells are used. An early use of the term "electrowetting" was in 1981; "electrowetting" was used in G. Beni and S. Hackwood, Appl. Phys. Lett. 38, 4, pp. 207-209 (1981). The electrowetting effect was originally defined as "the change in solid electrolyte contact angle due to an applied potential difference between the solid and the electrolyte". Since then a number of devices based on electrowetting have been devised. The phenomenon of electrowetting can be understood in terms of the forces that result from the applied electric field. The fringing field at the corners of the electrolyte droplet tend to pull the droplet down onto the electrode, lowering the macroscopic contact angle, and increasing the droplet contact area. Alternatively electrowetting can be viewed from a thermodynamic perspective. Since the surface tension of an interface is defined as the Gibbs free energy required to create a certain area of that surface, it contains both chemical and electrical components. The chemical component is just the natural surface tension of the solid/electrolyte interface with no electric field. The electrical component is the energy stored in the capacitor formed between the conductor and the electrolyte. In the present document the term 'electrowetting cell' describes in particular a single optical element changing the amplitude and/or phase of a wave field. The electrowetting cell includes a chamber having cell walls filled with at least two different non-miscible fluids or liquids, especially a conductive polar fluid or liquid, like water, and an insulating non-conductive fluid or liquid, like oil. It is noted and understood that a fluid can be a liquid or a gas. In general, a fluid is a subset of the phases of matter and include liquid, (saturated) gas, plasma and, to some extent, plastic solid. It is noted that the term "electrowetting" within the context of this document is also to be understood as "electrowetting-on-dielectrics" (EWOD).

3. Discussion of Related Art

WO 2004/044659 (US2006/0055994) filed by the applicant describes a device for reconstructing three-dimensional scenes by way of diffraction of sufficiently coherent light; the device includes a point light source or line light source, a lens for focusing the light and a spatial light modulator. In contrast to conventional holographic displays, the SLM in transmission mode reconstructs a 3D-scene in at least one 'virtual observer window' (see Appendix I and II for a discussion of this term and the related technology). Each virtual observer window is situated near the observer's eyes and is restricted in size so that the virtual observer windows are situated in a single diffraction order, so that each eye sees the complete reconstruction of the three-dimensional scene in a frustum-shaped reconstruction space, which stretches between the SLM surface and the virtual observer window. To allow a holographic reconstruction free of disturbance, the virtual observer window size must not exceed the periodicity interval of one diffraction order of the reconstruction. However, it must be at least large enough to enable a viewer to see the entire reconstruction of the 3D-scene through the window(s). The other eye can see through the same virtual observer window, or is assigned a second virtual observer window, which is accordingly created by a second light source. Here, a visibility region i.e. the range of positions from which an observer can see a correct reconstruction, which would be rather large, is limited to the locally positioned virtual observer windows. This virtual observer window solution uses the larger area and high resolution of a conventional SLM surface to generate a reconstruction which is viewed from a smaller area which is the size of the virtual observer windows. This leads to the effect that the diffraction angles, which are small due to geometrical reasons, and the resolution of current generation SLMs, are sufficient to achieve a high-quality real-time holographic reconstruction using reasonable, consumer level computing equipment.

A mobile phone which generates a three dimensional image is disclosed in US2004/0223049. However, the three dimensional image disclosed in US2004/0223049 is generated using autostereoscopy. One problem with autostereoscopically generated three dimensional images is that typically the viewer perceives the image to be inside the display, whereas the viewer's eyes tend to focus on the surface of the display. This disparity between where the viewer's eyes focus and the perceived position of the three dimensional image leads to viewer discomfort after some time in many cases. This problem does not occur, or is significantly reduced, in the case of three dimensional images generated by holography.

SUMMARY OF THE INVENTION

According to the invention, a spatial light modulator for modulating light field amplitude comprises a surface relief grating adapted to act as a diffractive lens, where a material is used to fill at least one groove of a surface grating structure, such that a controllable refractive index of the material inside the surface relief grating is controlled by an electric field, which leads to a controllable intensity at a fixed focal point.

The material could be a liquid crystal, and the controllable refractive index is the controllable refractive index $n_{LC}$ of the liquid crystal.

The material could be an electro-optic material, and the controllable refractive index is the controllable refractive index of the electro-optic material.

The surface relief grating could be a discontinuously or a continuously shaped surface relief structure.

Contrast could be enhanced by using an aperture stop and in which a spherical lens or ball lens is used inside the aperture stop. Contrast could be enhanced by using an aperture stop and an axicon. Preferably, the axicon is a variable axicon. The axicon could have one surface which is the surface of a lens. Contrast could be enhanced using a Fabry-Perot interferometer.

The light modulation switching time could be less than or equal to 5 ms and/or greater than or equal to 100 microseconds. The spatial light modulator could be operable at conventional switching frequencies, preferably in the frequency range from 15 Hz to several KHz, or in which the spatial light modulator is operable to maintain a predetermined state for a predetermined period of time.

Preferably, the spatial light modulator is used with sparse object reconstruction.

The spatial light modulator could be used in a 3D display. Especially, the spatial light modulator could be used in a holographic display or in a stereoscopic display, preferably in an auto stereoscopic display. One or two virtual observer windows for the eyes of one or more observers could be used.

The spatial light modulator could be used in a two dimensional amplitude modulating display.

The modulated light could be visible light and/or near infra red light and/or near ultraviolet light.

The spatial light modulator could be used in military applications, especially in laser radar systems. The spatial light modulator could be used to form a secondary light source. The spatial light modulator could be used to form a light source array with variable amplitude.

In a preferred embodiment, the spatial light modulator is used in transmission or in a reflective geometry.

The spatial light modulator of any of the claims 1 to 22 can be combined with an additional spatial light modulator, the additional spatial light modulator being adapted to modulate the phase of light interacting with the additional spatial light modulator. Examples of such an additional spatial light modulator are described in this document.

According to the invention, a display device includes the spatial light modulator of any of the claims 1 to 23. The display device could have up to several million pixels. The display device could contain a diffuser foil.

The display device could be a 2D phase modulating display device or a stereoscopic display device. The display device could be a holographic display device. The holographic display device preferably uses virtual observer windows for the eyes of the observer or observers.

According to the invention, a method uses a display device of any of claims 1 to 23, the display including a light source and an optical system to illuminate the spatial light modulator; comprising the step of:

for each pixel, modulating the light field amplitude transmitted by each pixel using a surface relief grating adapted to act as a diffractive lens, where a material is used to fill at least one groove of a surface grating structure, such that a controllable refractive index birefringence of the material inside the surface relief grating is controlled by an electric field. It is noted that birefringence of the material is possible but is not mandatory to realize the principle of the modulator. However, birefringence is present if liquid crystals are used.

BRIEF DESCRIPTION OF THE DRAWINGS

FIG. 1 is a schematic cross-sectional view of one electrowetting cell with a central absorbing oil droplet, where sub-figure (a) shows the cell in its ON state, sub-figure (b) shows the cell in its OFF state, and sub-figure (c) shows the cell in a partially light-attenuating state.

FIG. 2: FIGS. 2A and 2B are cross-sectional views of one display pixel, comprising the electrowetting cell positioned near the focus of a first focusing element and a second, confocally positioned focusing element.

FIG. 3: FIGS. 3A and 3B are cross-sectional views of one display pixel, comprising the electrowetting cell positioned near the focus of a focusing element which is followed by a diffuser foil.

FIG. 4: FIGS. 4A and 4B show the combination of a spherical focusing element with an electrowetting cell comprising a circular pinhole aperture and an alternative combination of a cylindrical focusing element with an electrowetting cell comprising a slit aperture, respectively.

FIG. 5: FIGS. 5A and 5B show a schematic cross-sectional view of one electrowetting cell with a ring-shaped absorbing oil droplet, with the cell in its ON state and the cell in its OFF state, respectively.

FIG. 16 shows an optical phase modulating element, using an electrowetting cell.

FIG. 17 shows an optical phase modulating element, using an electrowetting cell.

DETAILED DESCRIPTION

Figure 6:
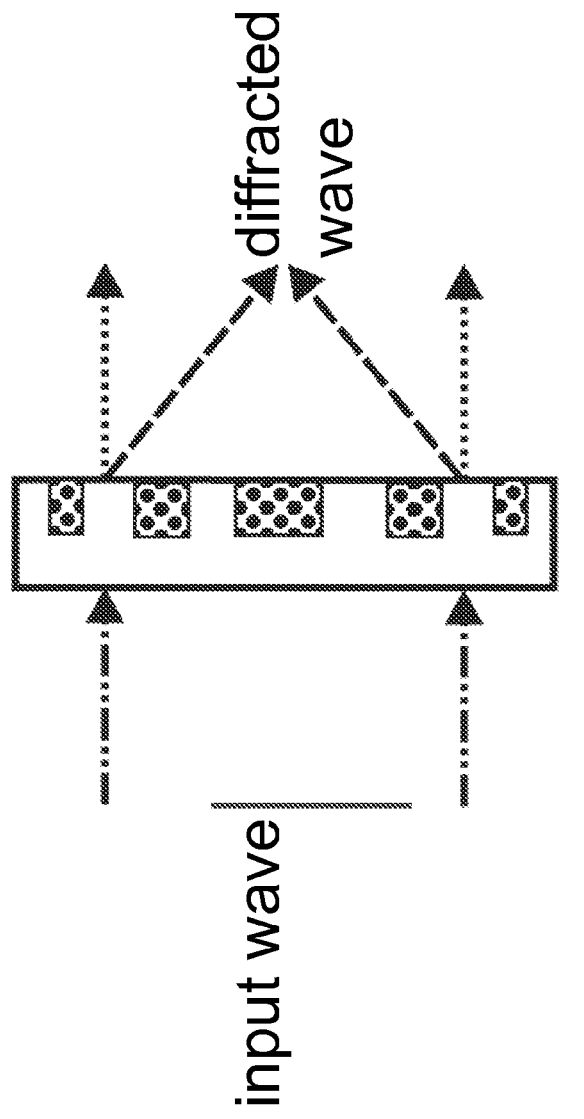
FIG. 6 shows how a controllable refractive index $n_{LC}$ of a liquid crystal inside a surface relief grating leads to a controllable intensity of a fixed focal point. The part of the diffracted light (dashed line) depends on the diffraction efficiency η of the diffractive structure. The diffraction efficiency is changed by the change of the modulation $\Delta n(U)=n_{LC}(U)-n_{substrate}$.

Various implementations will now be described.

A. Spatial Light Modulator for Modulating Light Field Amplitude and Display Device Using Electrowetting Cells This implementation relates to a spatial light modulator, and in particular to a spatial light modulator comprising pixels, where for each pixel, a light field amplitude transmitted by the pixel is modulated by an electrowetting cell. The spatial light modulator may be used to generate a desired video hologram.

This implementation relates to a spatial light modulator, and in particular to a spatial light modulator suitable for displaying dynamic computer-generated holograms, where the amplitude of a light field is spatially modulated. It also relates to an active matrix display device incorporating a spatial light modulator according to the implementation, more particularly to an electrowetting display device. It further relates to a switchable light source and light source array with an individually adjustable intensity incorporating a light modulator of the present implementation.

It is an object of the present implementation to provide a fast or very fast amplitude modulation of a light field using the electrowetting principle, and a corresponding display device. However, the spatial light modulator may also be operable at more conventional switching frequencies.

Each electrowetting cell comprises at least a first substantially transparent substrate coated with a substantially transparent electrode and hydrophobic isolation layers, a pixel-separating side wall, a first opaque or absorbing liquid and a second electrically conductive or polar liquid where these two liquids are immiscible, and a second, substantially transparent substrate. The amount of light passing through the electrowetting cell is controlled by a voltage applied to the electrically conductive or polar liquid.

According to a first implementation, a spatial light modulator is provided having a plurality of electrowetting cells. In a preferred example, each cell comprises the following:

A first, substantially transparent substrate coated with a substantially transparent electrode and hydrophobic isolation layers;

A pixel-separating side wall

A first, opaque or light absorbing liquid and a second, electrically conductive or polar liquid where those two liquids are non-mixable;

A second, substantially transparent substrate optionally coated with a substantially light absorbing layer with a centrally disposed transparent aperture, where the electrowetting cell is positioned near the focus of a focusing element, and where the amount of light passing through the electrowetting cell is controlled by a voltage applied to the second liquid such that the contact angle of said first opaque liquid is changed, and therefore the shape of the interface between said immiscible liquids is modified, and as a consequence, more or less light is absorbed by the opaque liquid. The electrowetting cell is smaller or much smaller than the focusing element. The applied voltage is applied directly such as from a controllable source of electrical potential difference, such as in an electrically addressable SLM. The contact angle of the electrically conductive or polar liquid and the first substantially transparent substrate is continuously variable by applying different voltages thus realising a continuously variable absorption in the cell.

A display device according to the present implementation comprises a light source, a first focusing element, said electrowetting cell, and a second focusing element. The minimum pixel pitch of the display is defined by the size of the light focusing element.

According to a second implementation, a switchable point source or point source array having one or more electrowetting cells is provided. A switchable point source or point source array according to the present implementation comprises a light source, a focusing element, and said electrowetting cell.

The terms 'opaque', 'absorbing' and 'transparent' denote wavelength-dependent material properties, i.e. they are related to the wavelength of the electromagnetic radiation whose amplitude is to be modulated with the help of the modulator according to this implementation. The modulator according to this implementation is thus not limited to the spectral range of the visible light, but includes the near infra red and near ultraviolet. For example, military applications in the near infra red are possible, such as in laser radar systems.

The implementation will now be described in detail with the help of particular examples. The examples relate to the electrowetting approach and can be combined with various focusing elements to realize amplitude modulating spatial light modulators. These spatial light modulators can be used in display devices, especially in holographic display devices. It is also possible to use these spatial light modulators to form a secondary light source or a light source array with variable amplitude. Secondary light sources may be used in back light units (BLU) of display devices.

FIG. 1 illustrates a first example of an electrowetting cell. It comprises a hermetically sealed hollow body which is filled with two immiscible liquids. One of the liquids is optically transparent, polar and electrically conductive; it will be referred to below as a water-based liquid. It is known from the prior art that this liquid can be water with added salts, or a polar or conductive liquid, or any other liquid which is made conductive by adding ionic components. A second liquid comprises an optically opaque, light absorbing liquid, e.g. an oil-based liquid. This second liquid is electrically insulating or non-polar; suitable substances are for example oils, alkanes or alkane mixtures. It is known that both liquids preferably have the same or similar density, so as to prevent shape deviations due to gravitational force or mechanical vibrations.

The shape of the light absorbing liquid can be changed in a specific manner taking advantage of the electrowetting principle such that the transmitted optical radiation is not attenuated, or is partly or fully attenuated. The electrowetting cell according to this implementation comprises a transparent substrate (e.g. glass or plastic) on to which a thin electrode film (e.g. an indium-tin oxide (ITO) layer, approx. 50-100 nm thick) is applied which is optically transparent and electrically conductive. The ITO coating can be applied for example with the help of sputtering processes. Then, for example, an approx. 1 μm thick, hydrophobic dielectric insulator layer is applied on to the electrode film, such as by way of dip coating and curing. This insulator film can for example be made using an amorphous fluoro-polymer (e.g. Teflon) dissolved in a fluoride solution. An additional centring means may be disposed in the centre of the cell, for example a hydrophobic spot, which enables the oil-based liquid droplet to be held in a preferred position. The side walls of the cell can be made by shaping silicon, e.g. with the help of commonly used etching processes, such as reactive ion etching (RIE) or plasma etching (ICP). Alternatively, optical structuring methods can be used, and the side walls can be formed using photoresist. In the case silicon walls are used, these directly form the counter electrode; if photoresist walls are used, these may be additionally coated with a conductive material or the electrical supply line ends directly in the water-based liquid volume. A further thin cover substrate seals the cell hermetically.

According to a preferred example of the electrowetting cell, the top face of the cover substrate is coated with an optically non-transparent, preferably absorbing layer, which exhibits a centrally disposed optically transmitting opening (pinhole aperture). This aperture effects a spatial filtering and represents a secondary light source with adjustable intensity. In this implementation, the light is transmitted through the electrowetting cell with a spherical or cylindrical outgoing wavefront, where the cell is positioned near a focal point or near the beam waist of a ray bundle or of a Gaussian beam. The cell is in the ON state if a DC or AC voltage is applied between electrode and counter electrode, as shown in FIG. 1(a). In this state, the electrically conductive or polar liquid or water-based liquid is attracted to the hydrophobic insulator layer caused by electrostatic forces, thereby displacing the opaque or absorbing or oil-based droplet, which is positioned around the central spot. As a consequence, a large portion of the light is transmitted through the cell. By applying different voltages, the water contact angle can be varied continuously, thus realising a continuously variable absorption in the cell, resulting in an amplitude A of the light passing through the electrowetting cell, as shown in FIG. 1(c). The cell is in its OFF state if no voltage is applied, as shown in FIG. 1(b). Due to the hydrophobic coating of the dielectric base substrate, the oil droplet spreads across the entire base area or at least across large parts of it. The light which is incident on the cell is fully absorbed in the OFF state.

FIG. 5 illustrates a second example of an electrowetting cell. In contrast to the first example in FIG. 1, the opaque or absorbing liquid or oil-based liquid is disposed at the fringes of the electrowetting cell and is held in this preferred position by suitable means. If no voltage is applied, the oil-based liquid spreads across the base area. A small separation ring can preferably be positioned in the centre of the cell, which ensures that there is permanent contact to the water-based solution and that the oil spreads homogeneously in all directions when the cell is switched on. Other examples of electrowetting cell configurations will be obvious to those skilled in the art.

FIG. 2 shows the use of an electrowetting cell in combination with two converging or focussing elements according to a first example of a display device. The combination of these three elements represents a pixel of a display. The minimum pixel pitch is determined by the size of the focusing element. The electrowetting (EW) cell may be small or very small compared with the lateral dimension of a focusing element, which allows very fast switching times to be achieved, because the liquid volume to be moved is small, and the distance to be moved is small. A typical switching time is in the range from 100 microseconds to 5 milliseconds, but it strongly depends on the cell size. The cell is disposed near the focal point of the first focusing element or near the intermediate image of a light source. The position is preferably chosen such that the exit pupil of the electrowetting cell coincides with the position of the intermediate focus. The axial shift of the intermediate focus due to refraction at the electrowetting cell is preferably taken into account. The exit pupil of the electrowetting cell represents a secondary light source, which is imaged through a second optical element into the desired position. FIG. 2 shows a refractive microlens which collimates the light again. Alternatively, the second optical element could have a diverging effect or be disposed non-confocally to the intermediate focus. The effect of the optical elements shown can be refractive, but also reflective or diffractive. The two sub-figures of FIG. 2 illustrate the conditions for a pixel in the ON state and in the OFF state. Here, and in some other Figures, only one pixel is shown, but it will be appreciated by those skilled in the art that a real display device may have any number of pixels, up to several million pixels or more. It is noted that the single pixels shown in FIGS. 2 and 3 do not comprise a scale. The length of a side of a pixel of FIG. 2 would be approximately the same size as the diameter of the lens shown on the right side.

FIG. 3 shows the use of an electrowetting cell in combination with a converging or focusing element and a diffuser foil according to a second example of a display device. Such an arrangement is preferable if no further imaging is required, and if the diffuser foil is to be used as an illuminated display surface. The two sub-figures of FIG. 3 illustrate the conditions for a pixel in the ON state and one in the OFF state. Here only one pixel is shown, but it will be appreciated by those skilled in the art that a real display device may have any number of pixels, up to several million pixels or more.

FIG. 4 illustrates various examples of the electrowetting cell. The aperture of the electrowetting cell can have various forms. A preferred example is a circular aperture, as already described above, which allows a spherical secondary wave to be formed when the light is emitted through the opening. Another preferred example is a slit aperture, which allows a cylindrical secondary wave to be formed when the light is emitted through the opening. In the latter example, the electrowetting cell has a rectangular base, where the absorbing liquid is for example arranged in the form of a line.

According to a preferred arrangement, multiple pixels are arranged in the form of a line array or matrix. The individual pixels are discretely controllable. Because of their small size, they are capable of switching fast or very fast. An arrangement in the form of a matrix is preferred in the context of display applications. Colour contents may be presented on the display by switching on the primary colours red, green and blue one after another using a time multiplexing method. The colour mixture may be achieved by way of pulse width modulation, which is realised either in the light source, on the way to the display pixel according to this implementation, or directly in the electrowetting cell. The latter is achieved by varying the hold time of the cell in the ON or OFF state. However, individual cells for the display of primary colours are also possible.

A further example according to this implementation relates to a variable light source or to a variable light source array. The light source has therein preferably the form of a point or line light source. The term 'variable' is used here to describe a variable intensity of the respective source. An arrangement as sketched exemplarily in FIG. 4 can be used to generate spherical or cylindrical secondary waves with variable amplitude. Variable or switchable light sources are of interest for example for applications such as in holographic displays, amplitude modulation displays, or in optical measuring equipment.

An advantage of electrowetting cells is that the moving parts are liquid. The absence of moving solid parts reduces device wear compared to devices in which moving solid parts are in mechanical contact with other solid parts, where device wear reduces device lifetime and consistency of performance over time.

One skilled in the art will appreciate that amplitude modulation may be implemented on a pixel by pixel basis, and that a display may contain up to several million pixels, or more. The amplitude spatial modulator described may be used in a 3D display, such as a holographic display, especially in a holographic display in which the viewer views the holographic reconstruction through virtual observer windows. One or two virtual observer windows for the eyes of each of one or more observers are used. The amplitude spatial modulator described may also be used in a two dimensional amplitude modulating display, or in other applications in which amplitude modulating spatial light modulators are employed. The amplitude spatial modulator described may be used in transmission, or in a reflective geometry.

B. Amplitude Modulating Device for Imaging Means and Holographic Displays

The aim is to realize fast amplitude modulating devices which can be used in 2D or 3D displays. 3D displays include holographic displays, especially holographic displays which use the applicant's preferred approach to holography, as described for example in US2006/055994, US2006/139711, and in US2006/139710, which are incorporated by reference. A fast modulation of the pixels gives the opportunity to implement techniques like temporally multiplexed viewing windows or cross talk reduction by sparse object reconstruction. Sparse object reconstruction means that only a part of the grid of all object points is reconstructed in a given frame. Thus, the amount of cross talk between neighbouring object points can be reduced. For example, if only each second object point in the x and the y direction is reconstructed in one frame then four frames are needed to reconstruct all object points. This is one reason why faster SLM pixels are desirable. For example, if only the fourth object point is reconstructed, in x and y direction respectively, then sixteen frames of this sparse reconstruction will reconstruct all object points.

The response time of the light modulating devices should be fast and the number of realized intensity values of reconstructed (or displayed) object points should be high enough to provide a viewer with an acceptable quality image. However, the spatial light modulator may also be operable at more conventional switching frequencies. The SLM may have amplitude modulating pixels, phase modulating pixels or complex value generating pixels.

One opportunity is to use a surface relief grating which acts as a diffractive lens, where a liquid crystal is used to fill the grooves of the surface grating structure. In an index matched situation where $n_{LC}=n_{substrate}$, the device will act as a plane plate i.e. a plane wave will propagate through this device without any propagation direction change. In other words, the plane wave sees no grating-like structure in this case.

If a voltage U is applied, the refractive index of the liquid crystal $n_{LC}$ experienced by the input light wave is changed. The electrodes can be made transparent, e.g. by using ITO. In a refractive setup, a continuous change of the voltage will cause a continuous shift of the focus point. In a diffractive setup, a continuous change of the voltage will cause a continuous change of the diffraction efficiency of the grating. Thus, the binary surface relief grating can realize a fixed focal point with different intensity values from zero to one hundred percent of the initial intensity. The part which is not diffracted will pass through the element as a plane wave. This non-diffracted wave is shown in FIG. 6 by the dotted lines propagating straight ahead for light exiting the device.

In FIG. 6, a controllable refractive index $n_{LC}$ of a liquid crystal inside a surface relief grating leads to a controllable intensity at a fixed focal point. The part of the diffracted light (dashed lines for light exiting the device in FIG. 6) depends on the diffraction efficiency η of the diffractive structure. The diffraction efficiency is changed by the change of the modulation given by $\Delta n(U)=n_{LC}(U)-n_{substrate}$. In FIG. 6, gradient discontinuities are present at the boundaries between the liquid crystal domains and the host material.

Figure 7:
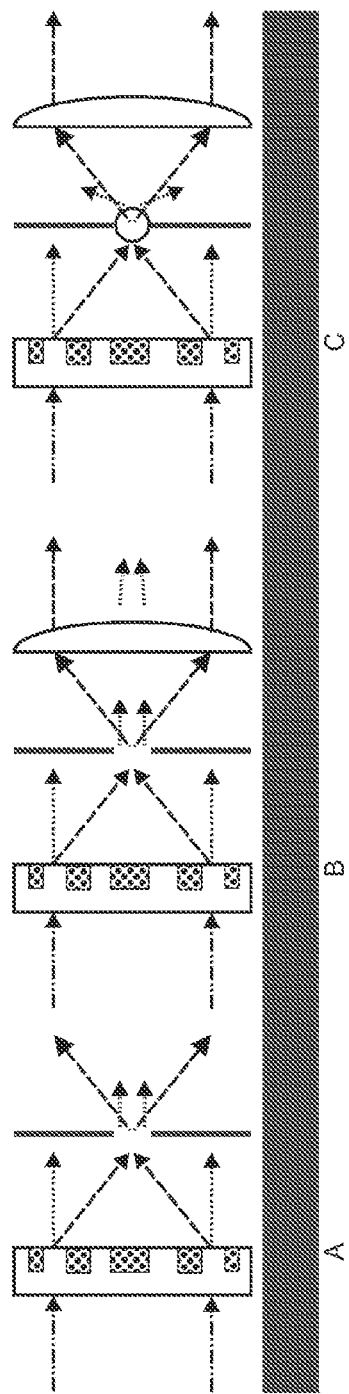
FIG. 7 shows different arrangements of a combination of a surface relief grating and a liquid crystal to realize an amplitude modulation.

If an aperture stop (AS) is placed behind a variable lens, then the intensity which propagates behind the aperture stop is controlled by the voltage being applied. In the case of a diffractive lens the aperture stop is placed in the fixed focal plane with a distance of the focal length f to the lens, or light modulation element. This is shown in FIG. 7A. To obtain a collimated plane wave, a second lens is added to the arrangement of FIG. 7A, leading to the setup shown in FIG. 7B. If the inner area of the aperture stop is too large, then a significant part of the non-diffracted light will still propagate behind the aperture stop. Thus the contrast which can be realized might be too low in respect to the specific application of the modulator. This problem can be reduced by placing a spherical lens or ball lens inside the aperture stop, as shown in FIG. 7C. As shown in FIG. 7C, the light being focused by the variable lens will pass through the small sphere without a change. A plane wave entering the sphere will leave the sphere with a strong divergence, as shown by the strongly diverging rays for light exiting the spherical lens in FIG. 7C. That means that the part of the plane wave which enters the transmitting area of the aperture stop will spread out. Thus the proportion of this unwanted light is reduced significantly.

The benefit of using a device consisting of a surface relief grating being filled with a liquid crystal is the opportunity to realize a fast switching time of less than 5 ms, and in a preferred case less than 2 ms, but still typically greater than 100 microseconds if liquid crystals are used. For a small numerical aperture of NA<0.4 it can be assumed that the realized functionality is independent of the polarisation of the light used. It is also possible to use electro-optical materials. Such materials are used for instance in Kerr cells or Pockels cells. Low-voltage crystalline materials need at least 100 V and high-voltage materials need several thousand volts in order to switch, but the switching time may be less than 100 microseconds. Electro optical polymers can be used at lower voltages.

It is also possible to use a multi order Fresnel lens instead of a binary surface relief structure. Thus the modulator can be optimized to work for several wavelengths in the same way.

It is also possible to fill a continuously shaped (i.e. no abrupt edges are present, or equivalently, no gradient discontinuities are present) surface relief pattern with a liquid crystal. Thus, a continuous shift of the focal point can be achieved by applying a voltage U. If the focal length f(U) is chosen to be equivalent to the distance of the aperture stop (AS), then approximately all the intensity is transmitted through the modulator. Only a small part of the propagating light will pass the aperture stop if the focal length is set to infinity. The part which propagates behind a second lens which is used to recollimate the light, analogously to FIG. 7B, can be reduced significantly. This can be done by implementing a small spherical lens inside the centre of the aperture stop. With such a spherical lens, the setup is analogous to FIG. 7C.

One opportunity to achieve a variable focal length used for an amplitude modulating element is to use an electro wetting cell. In this case possible setups are equivalent to the setups shown in FIG. 7. The diffractive lens is replaced by an electro wetting lens which realizes a variable focal length f(U). Electrowetting cells may be as discussed elsewhere in this document.

If a phase shift is realized by a variable focal length and in addition to that an aperture stop is used which is made of a light absorbing electro wetting fluid, then an element realizing complex values of the propagating field is obtained. If one looks at the part of the light which is on axis then the change of the focal length of an electro wetting lens is equivalent to a change of the optical path length. Thus the phase is changed if the central thickness of a lens is changed. It is known that light absorbing oil may be used to form optical valves in flat panel displays using electro wetting. The same oil can be used for different wavelengths.

Figure 8:
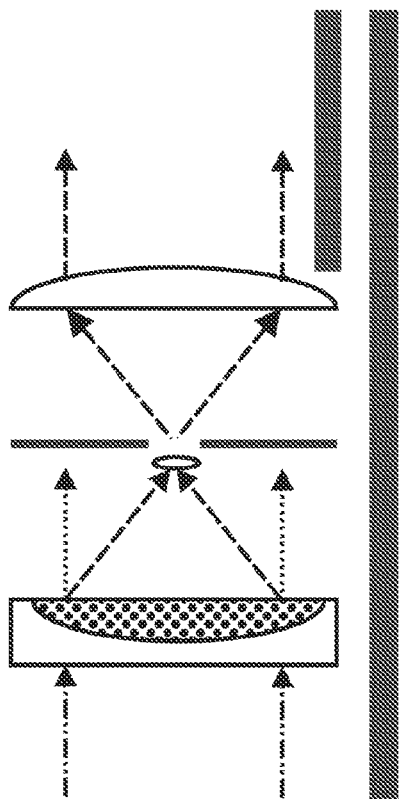
FIG. 8 shows how a circular focus can be used to obtain an amplitude modulating device with a high contrast. By changing the focal length of a lens the intensity value being transmitted can be chosen. A circular spot is realized by a combination of an axicon and a lens. Also a circular phase function in front of a lens can be used to obtain a circular focus. An enlarged circular focus will be stopped by the aperture stop AS in a way that no light will pass the central clear area of the aperture stop AS. Thus a high contrast can be obtained.

There are different opportunities to enhance the contrast which can be obtained by the modulating element. One opportunity is to generate a circular focus. For instance this can be done by combining a lens function with a circular aperture, a Fabry-Perot interferometer or with an axicon. An axicon is a specialized type of lens which has a conical surface. It is also sometimes called a cone lens. An axicon transforms a collimated laser beam into Bessel beam. If, in addition to that a convex lens is used, then a ring is formed. The focal distance f(U) can be chosen in a way that the complete circular spot will pass the aperture stop. This is shown in FIG. 8. By changing the focal length, the focal spot can be enlarged in a way that no propagating light will pass the aperture stop. Thus a continuous intensity range from zero to one hundred percent of the initial value can be chosen by applying the appropriate voltage.

For the case of a Fabry-Perot interferometer, if a Fabry-Perot interferometer is illuminated with a converging spherical wave then a set of circular rings can be seen at the exit plane of the Fabry-Perot etalon. This behaviour of an etalon is well known. A change of the focal length of the lens which is placed in front of the Fabry-Perot etalon can be used to change the diameter of a circular ring.

In FIG. 8, a circular focus can be used to obtain an amplitude modulating device with a high contrast. By changing the focal length of a lens the intensity value being transmitted can be chosen. A circular spot is realized by a combination of an axicon and a lens. Also a circular phase function in front of a lens can be used to obtain a circular focus. An enlarged circular focus will be stopped by the aperture stop AS in a way that no light will pass the central clear area of the aperture stop AS. Thus a high contrast can be obtained. A small enough ring will be fully transmitted whereas a large ring will be fully blocked. If inside the inner area of the aperture stop, shown in FIG. 8, a diffuser is placed, then a second lens will collimate the propagating light in the required way without a change of the z position of this second lens or without a change of the focal length of this second lens.

Figure 9:
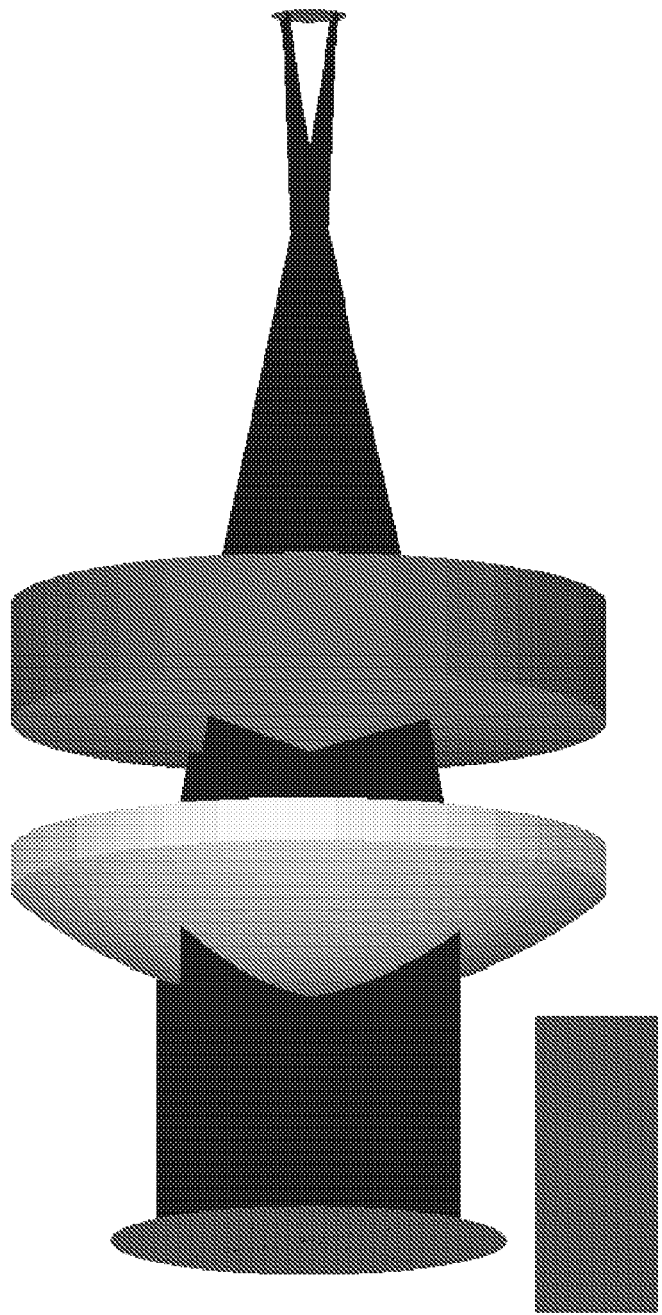
FIG. 9 shows a setup of a lens and an axicon which is placed behind the lens.

FIG. 9 shows the generation of a circular focus by combining a lens with an axicon. The diameter of the circular focus can be changed continuously by changing the focal length of the lens.

As a modification of the setup discussed so far, the diameter of the circular spot also can be changed by implementing a variable axicon. A liquid crystal combined with a cone can act as a variable axicon.

Figure 10:
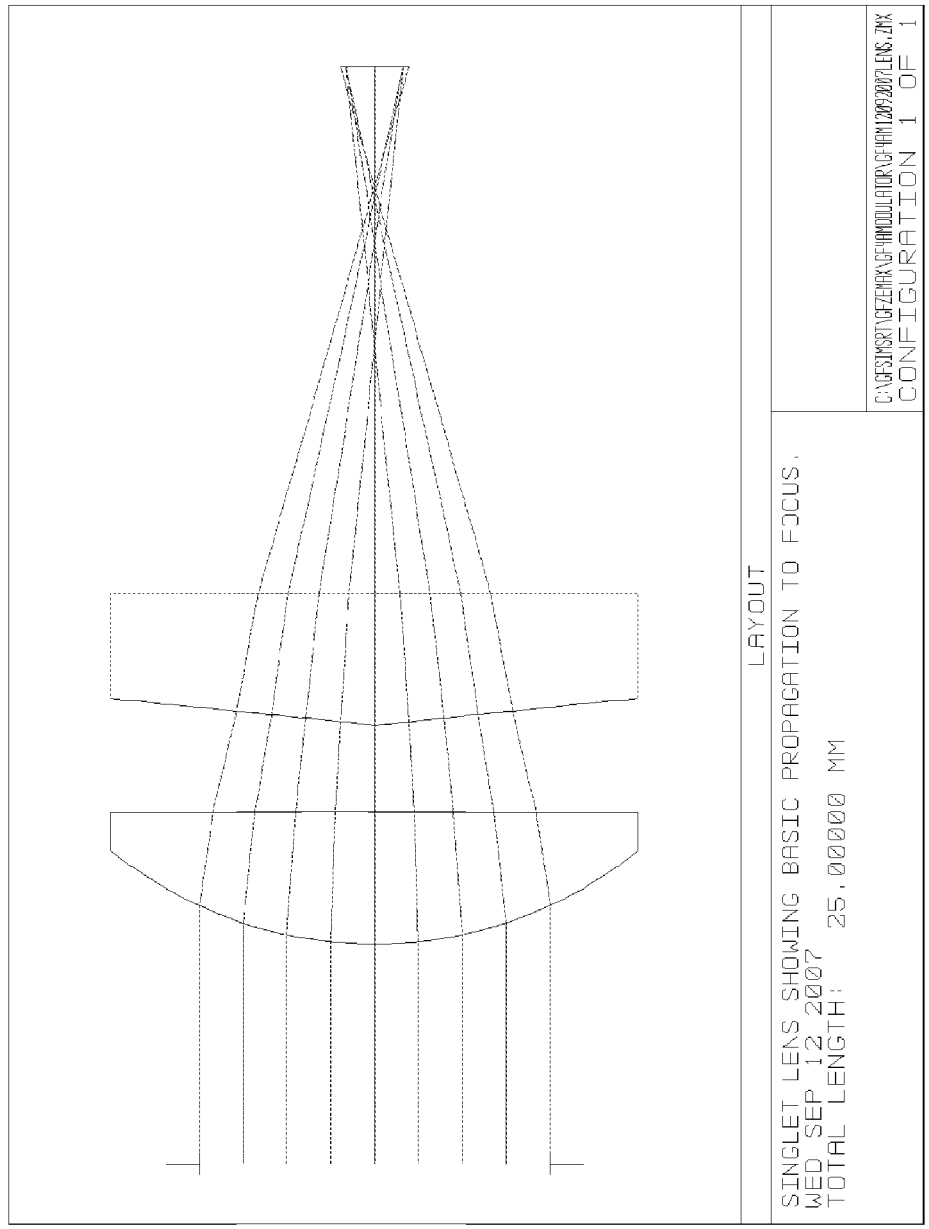
FIG. 10 shows a side view of a combination of a lens and an axicon which forms a circular focus.
Figure 11:
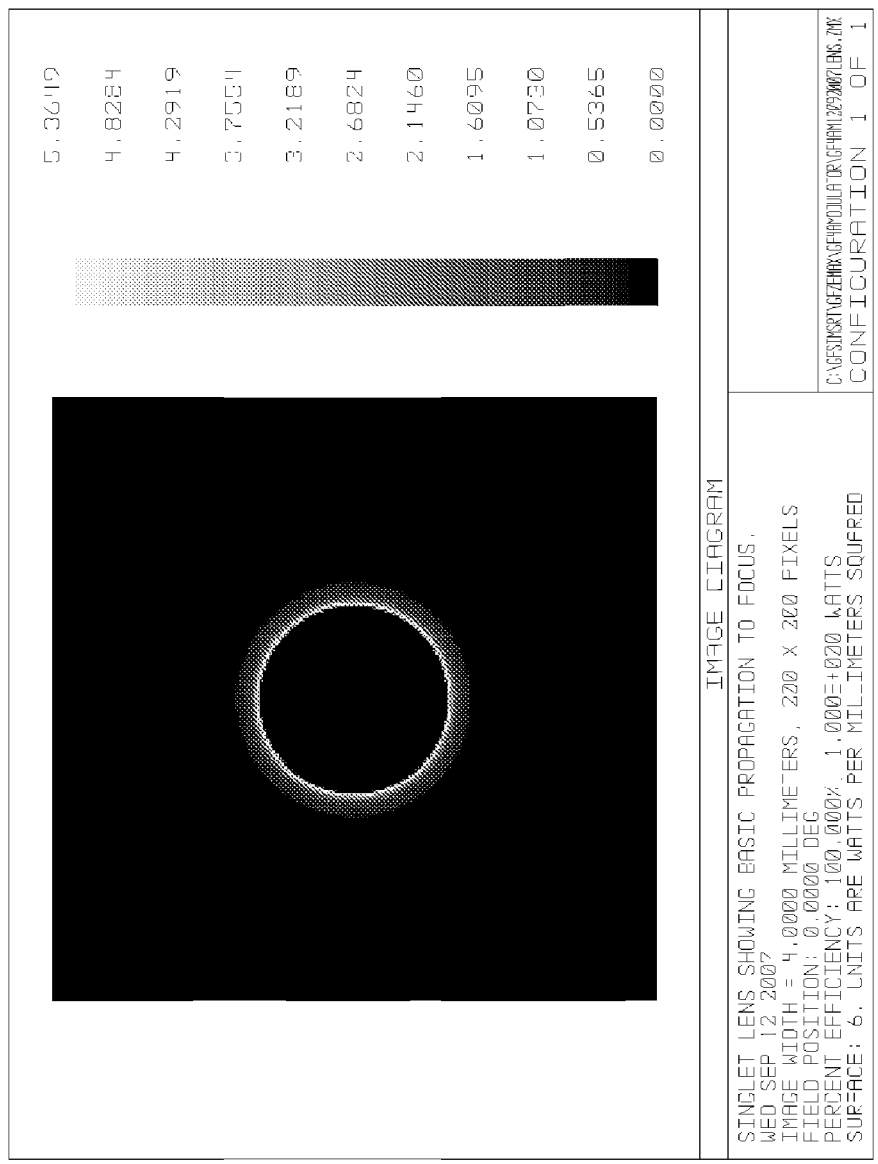
FIG. 11 shows a circular focus behind a combination of a lens and an axicon.

FIG. 10 shows a side view of a combination of a lens and an axicon which forms a circular focus. FIG. 11 shows a circular focus behind a combination of a lens and an axicon. The image analysis is performed using Zemax software supplied by ZEMAX Development Corporation, 3001 112th Avenue NE, Suite 202, Bellevue, Wash. 98004-8017 USA.

Figure 12:
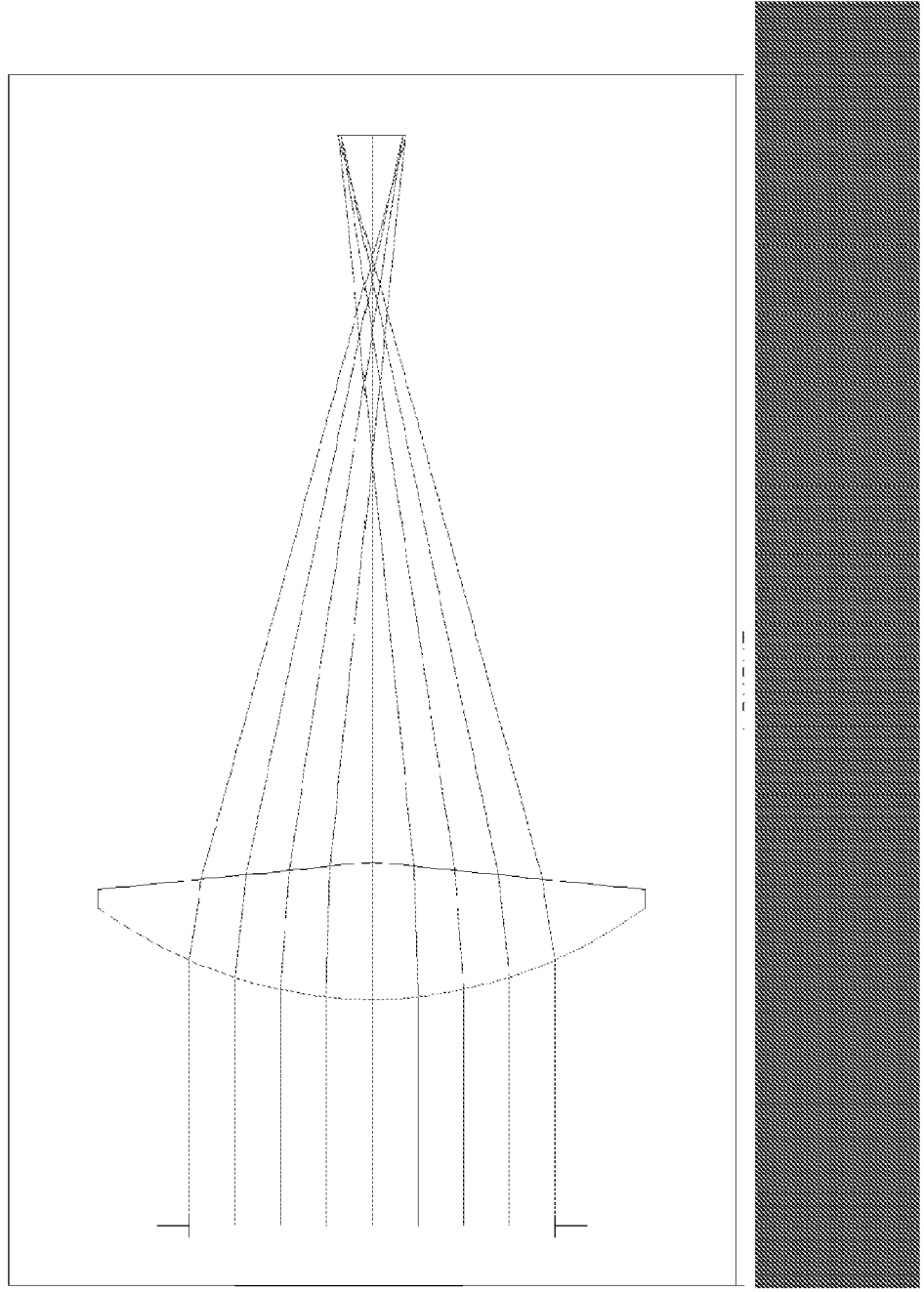
FIG. 12 shows a side view and beam path through a combination of a lens and an axicon which forms a circular focus. The diameter of the circular focus can be changed continuously by changing the focal length of the lens.

A reduction of elements needed to obtain a ring focus can be obtained by using one surface of the lens to create the axicon. This is shown in FIG. 12, which was created using Zemax software. FIG. 12 shows a side view and beam path through a combination of a lens and an axicon which forms a circular focus. The diameter of the circular focus can be changed continuously by changing the focal length of the lens. The axicon also can be realized as a diffractive circular structure. But as long as the numerical aperture is low (e.g. NA<0.4), the functionality of the setups discussed here is independent of the polarization state of the light used.

Figure 13:
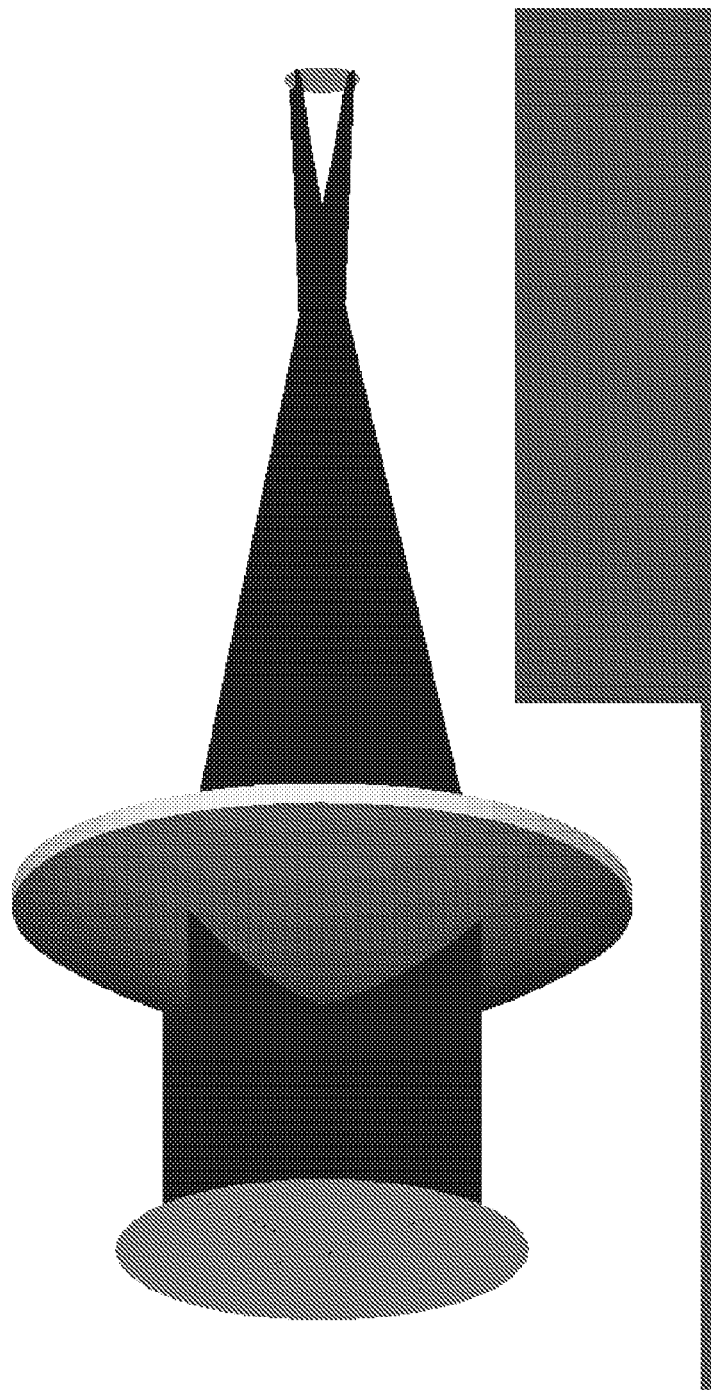
FIG. 13 shows generating a circular focus by combining a lens with an axicon in a single element.

FIG. 13 shows the generation of a circular focus by combining a lens with an axicon in a single element. In FIG. 13 a 3D layout of the setup shown in FIG. 12 is shown. The light enters the setup from the left-hand side and the plane where the aperture stop is placed is the plane at the right-hand side of FIG. 13.

Figure 14:
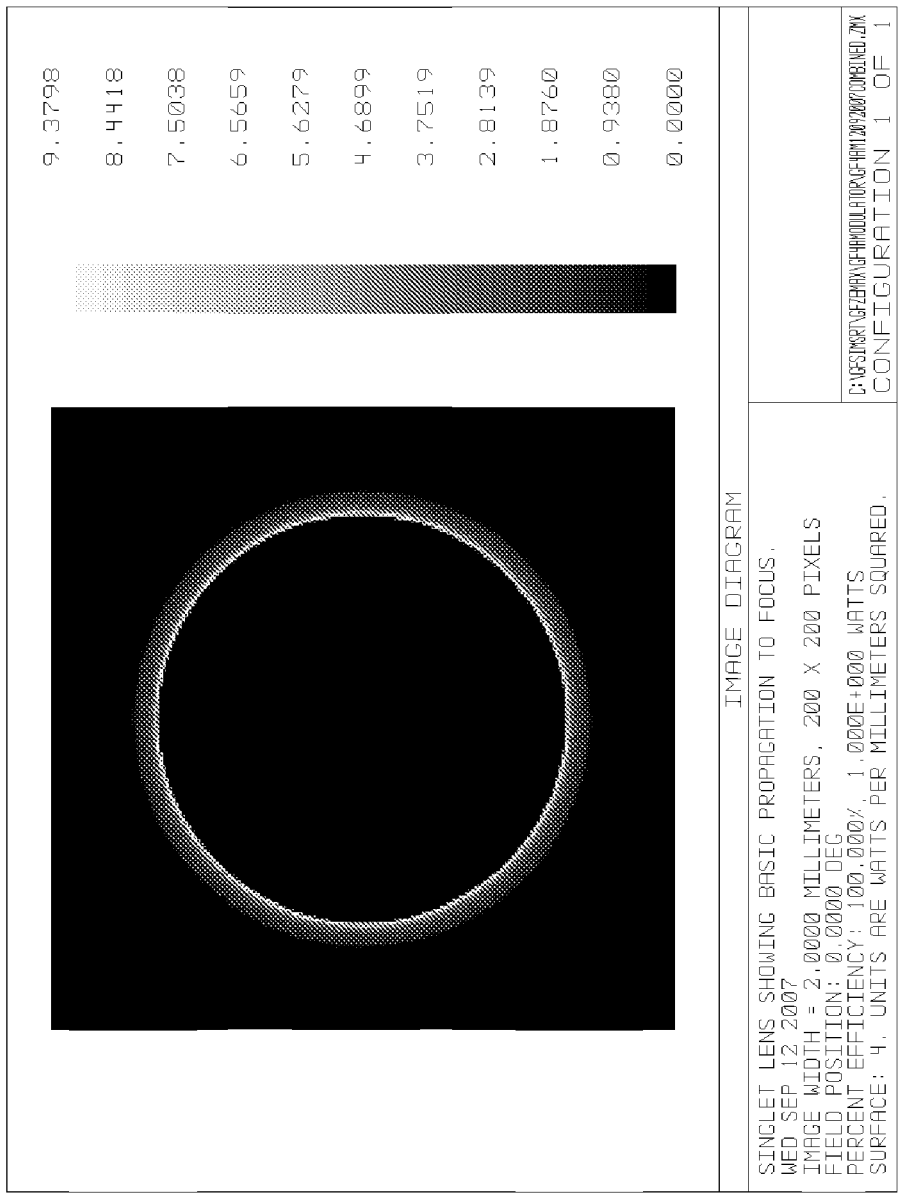
FIG. 14 shows a realized circular focus in the image plane of the setup shown in FIG. 13.

FIG. 14 shows a realized circular focus in the image plane of the setup shown in FIG. 13, obtained using Zemax image analysis software. FIG. 14 shows a two dimensional intensity distribution in the plane where an aperture stop is placed. By changing the focal length f(U) of the lens or the prism apex angle κ(U) of the cone forming the axicon, the diameter of the circular spot can be changed. The propagating light can be stopped by using an aperture stop AS if the diameter of the circular focus d(U) is chosen to be large enough.

Figure 15:
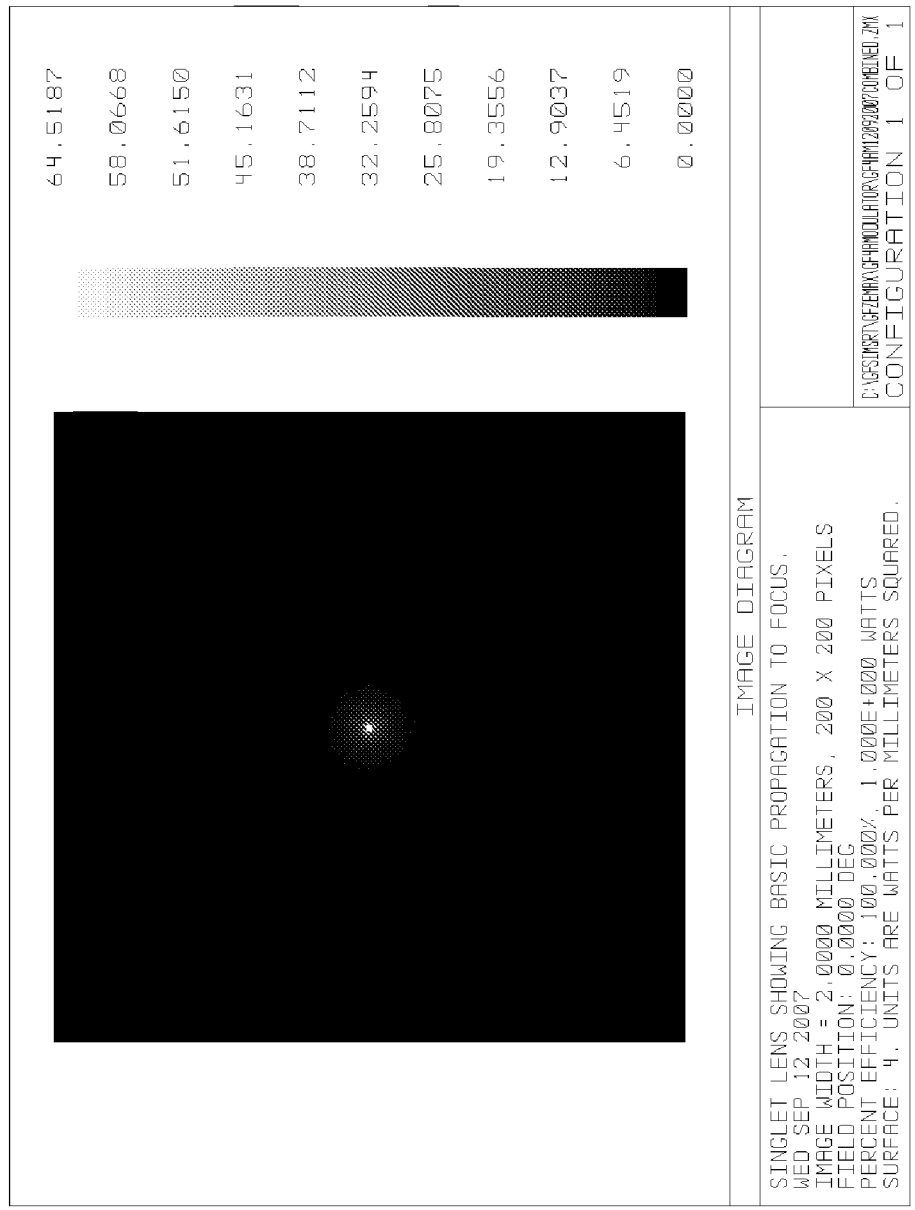
FIG. 15 shows a realized focus in the image plane of the setup shown in FIG. 13 in the case of an increased focal length f. Compared to FIG. 14, the focal length is enlarged by thirty percent in this example.

FIG. 15 shows a realized focus in the image plane of the setup shown in FIG. 13 in the case of an increased focal length f, obtained using Zemax image analysis software. Compared to FIG. 14, the focal length is enlarged by thirty percent.

Another approach is to use cylindrical grooves of a substrate filled with birefringent material. This can be done in a way that one polarization sees an index matched situation and the perpendicular polarization sees a cylindrical lens. At the focal distance of this lens a slit is placed. Thus the amplitude can be changed by changing the polarization state. If a slit is used to form the aperture, then the transmission can be changed by changing the polarization state of the light entering the configuration described.

One skilled in the art will appreciate that amplitude modulation may be implemented on a pixel by pixel basis, and that a display may contain up to several million pixels, or more. The amplitude spatial modulator described may be used in a holographic display, especially in a holographic display in which the viewer views the holographic reconstruction through virtual observer windows. The amplitude spatial modulator described may also be used in a two dimensional amplitude modulating display, or in other applications in which amplitude modulating spatial light modulators are employed.

C. Spatial Light Modulator for Modulating Light Field Phase Based on Electrowetting Cells and Display Device This implementation relates to a spatial light modulator which comprises an array of liquid-filled cells which can be discretely controlled with the help of the electrowetting principle such that they modulate the phase of an incident light field. The phase is modulated independently in each individual pixel of the liquid cell array. A cell (pixel) comprises at least three non-mixable liquid layers with at least two variably adjustable optical interfaces, where at least two liquids exhibit different optical properties. In general, the two variably adjustable optical interfaces may be parallel, or they may be non-parallel, such that a prism shape results. Taking advantage of the electrowetting principle, the contact angle of the liquids can be modified, thus causing a variable refraction at the variable optical interfaces. The variable interfaces are adjusted in a targeted manner such that the wave emitted by the pixel (i.e. the parallel bundle of rays) runs parallel to the waves emitted by the other pixels. Due to different optical path lengths within individual cells of a pixel array, a relative phase lag can be created among the waves which are transmitted or controlled by individual pixels.

The present implementation relates to a spatial light modulator for phase modulation of a light field, and to the manufacture of such a spatial light modulator.

Various designs of spatial light modulators (SLM) are known from the prior art under various names, and some of them are discussed elsewhere in this document. The best known example is a liquid crystal (LC) based modulator, where a voltage-induced birefringence is used for either phase or amplitude modulation of a light field. Spatial light modulators are used in a wide range of applications which are based on optical technologies and where variable or adaptive elements are required. The fields of application of spatial light modulators range from display and projection systems for the consumer goods sector to microscopy (optical tweezers, phase filter, digital holographic microscopy, in-vivo imaging), beam and wave front forming using dynamic diffractive elements (laser material processing, measuring equipment, focus control) optical measuring equipment (digital holography, fringe projection, Shack-Hartmann sensor) and applications in maskless lithography, ultra-fast laser pulse modulation (dispersion compensation) or in terrestrial telescopes (dynamic aberration correction).

Most of the liquid-crystal-based spatial light modulators which are commercially available today exhibit switching speeds which allow refresh rates of 60-120 Hz to be achieved i.e the switching time is greater than 8 ms. These switching speeds are sufficient for many applications. However, there are many applications which require lower switching times or higher refresh rates. This includes in particular applications which involve time multiplexing methods.

An object of the present implementation is to spatially modulate the phase of a light field, where the desired phase values are altered quickly or very quickly in contrast to LC-based SLMs. The phase $\phi$ should be adjustable in a range of $0 \leq \phi < m2\pi$, $m>1$ and m being a natural number and the refresh rates which are aimed at lie in a range of between some hundred Hertz and some kHz i.e. the response time should be less than or equal to 5 ms, but typically greater than or equal to 100 microseconds. However, the spatial light modulator may also be operable at more conventional switching frequencies. A further object is to cover the entire range of phase values by a relative modification of the phase values among the individual pixels of an areal matrix.

The physical functional principle of the spatial light modulator according to this implementation is based on the phase lag as a result of variable optical path lengths within an electrowetting cell. An electrowetting cell comprises at least three transparent optical liquids through which the light is transmitted one after another, seen in the direction of light propagation. The optical path length within a cell is changed with the help of variably adjustable interfaces between the immiscible liquids.

The modulator according to this implementation is not limited to the spectral range of the visible light, but includes the near infra red and near ultraviolet. For example, military applications in the near infra red are possible, such as in laser radar systems.

Examples of this implementation are explained in detail below and are illustrated by the accompanying drawings.

A first and preferred example (shown in FIG. 16) is based on the functional principle of a variable, pivoting plate with parallel sides. It is known from e.g. Malacara, D., Servín, M., and Malacara, Z., Interferogram Analysis for Optical Testing, $2^{nd}$ Ed. (Taylor & Francis, New York, 2005) pages 360 to 363, that a solid plate with parallel sides which is inclined out of its vertical position causes both a phase lag and a parallel offset of the transmitted wave. Here it is disclosed that this principle can be made use of in an electrowetting-actuated liquid cell if it is configured appropriately.

An electrowetting liquid cell may comprise three non-mixable liquids disposed one after another: oil- and water-based solutions can for example be used. The centrally disposed liquid exhibits optical properties (in particular a refractive index n) which differ from those of the two outer liquids. The two outer liquids may have an identical refractive index. It is known from the literature that plane interfaces can be achieved between two liquids if particular voltage differences are applied between two opposing electrodes, as shown for example by Smith, N. R., Abeysinghe, D. C., Haus, J. W., and Heikenfeld, J. Optics Express 14 (2006) 6557-6563. This principle is employed here. However, in a preferred example, three liquids are used and controlled such that the two interfaces between the three liquids are parallel. In the initial state, the two interfaces are parallel to the outer, fixed substrate interfaces (inclination angle $\gamma=0$). By applying defined voltage differences, the optical interfaces can be inclined while maintaining their planarity. The inclination angle is denoted by the letter $\gamma$. Further, it is provided that the inclination angles $\gamma_1$; $\gamma_2$ of the two variable interfaces are identical, i.e.

both interfaces preferably are parallel: $\gamma_1 = \gamma_2$ (see FIG. 16). This way, the optical functionality of a pivoting coplanar plate is realised, which, however, differs from its solid counterpart known from classic optics in that the thickness of the liquid plate here changes (it reduces) as the liquid plate is inclined. This is due to the liquid volume constancy within a cell. The phase lag $\Delta\phi$ can be derived from the geometrical conditions and is given by $$\Delta\phi = \left(\frac{2\pi}{\lambda}\right)\left\{\frac{dn_2}{\cos\left[\arcsin\left(\frac{n_1}{n_2}\sin\gamma\right)\right]} + vn_3\tan\gamma\right\} \quad (1)$$

where $n_i$ is the refractive index of liquid number i (i=1, 2, or 3), $\gamma$ is the inclination angle, d is the plate thickness, $\lambda$ is the optical wavelength in the vacuum, and v is the lateral offset, as shown in FIG. 16. The effective plate thickness of the embedded liquid is defined as $$d = h_b \sin\left(\frac{\pi}{4} - \gamma\right) \quad (2)$$

The lateral offset v is defined as $$v = d\sin\gamma\left(1 - \frac{n_1\cos\gamma}{\sqrt{n_2^2 - n_1^2\sin^2\gamma}}\right) \quad (3)$$

FIG. 16 is a cross-sectional view of a first example of an electrowetting cell of the spatial light modulator of this implementation. Three transparent optical liquids are disposed in layers in a cell, which is hermetically sealed by side walls and by transparent cover substrates. In the exemplary case, an electrically insulating or non-polar liquid (e.g. oil-based solution) is sandwiched between two polar, electrically conductive liquids (e.g. water-based solutions). Four electrodes are disposed on the side walls and can be addressed discretely. More electrodes can be disposed on the other walls being arranged parallel to the drawing plane (not shown). These electrodes can be controlled such that a predetermined angle between an interface between two adjacent liquids and the respective sidewall can be adjusted. The predetermined angle preferably is set to about 90 degrees. The optical liquids have the refractive indices $n_1$; $n_2$; $n_3$, where according to a preferred example $n_1 = n_3$. FIG. 16(a) shows the initial state of the electrowetting cell, where the voltages $U_{T1}$; $U_{T2}$; $U_{B1}$, $U_{B1}$, which are applied to the electrodes, and are chosen such that the water contact angles $\theta_{T1}$; $\theta_{T2}$; $\theta_{B1}$; $\theta_{B1}$ are all 90° in the initial state. The side walls are coated with a thin, for example approx. 1 μm thick, hydrophobic insulation layer. The thickness of the hydrophobic insulation layer can range from about 50 nm to up to some μm. The initial thickness of the central liquid layer is denoted by $h_b$. FIG. 16(b) shows the cell in an actuated state. The voltage pattern applied to the electrodes is here chosen such that the central liquid layer is inclined by an angle $\gamma$. The water contact angles are $\theta_{T1} = \theta_{B2}$ and $\theta_{B1} = \theta_{T2}$. This reduces the thickness d of the central liquid layer, where the thickness is here measured on the surface normal to the optical interface. The optical path length of the light which passes through the electrowetting cell changes as a result of the refraction at the optical interfaces. This leads to a phase lag of $\Delta\phi$ and to a parallel offset v.

For phase modulation, each electrowetting cell comprises at least three transparent optical liquids which are disposed in layers in a cell, which is hermetically sealed by side walls and by transparent cover substrates, where an electrically insulating or non-polar liquid is sandwiched between two polar, electrically conductive liquids, the optical liquids having the refractive indices $n_1$; $n_2$; $n_3$, where four electrodes are disposed on the side walls and can be addressed discretely, and where the side walls are coated with a hydrophobic insulation layer. The optical path length of the light which passes through the electrowetting cell changes as a result of the refraction at the optical interfaces. Alternatively, the cell may comprise a layer of polar, electrically conductive liquid which is sandwiched between two electrically insulating or non-polar liquids.

FIG. 17 is a cross-sectional view of a second example of an electrowetting cell of the spatial light modulator according to this implementation, which permits a controllable phase change for negligible change in the beam propagation direction. The general arrangement is similar to that of the first example shown in FIG. 16; however, the electrical addressing and thus the optical functionality of the cell are different. The optical functionality of a prism is achieved with the help of three liquids which have the refractive indices $n_1$; $n_2$; $n_3$. It is not necessary that $n_1 = n_3$; it is also possible to use different liquids for liquids 1 and 3. Different liquids 1 and 3 may be able to correct to some extent for each other's dispersion properties, and correct to some extent for the dispersion properties of liquid 2, for example. The general idea is that the same deflection angles β can be realised with different combinations of prism angles $\gamma_1$; $\gamma_2$. As a result of the refraction at the optical interface, the light passes through the electrowetting cell on different paths and is thus given a different phase lag than an adjacent cell with differently set prism angles $\gamma_1$; $\gamma_2$, while the deflection angle β remains the same. FIG. 17(a) shows the cell in its initial state and FIG. 17(b) shows the cell in its actuated state. Generally, any state can be referred to as the initial state: this term is only used to denote a reference state to which the phase values of other states are related.

Figure 18:
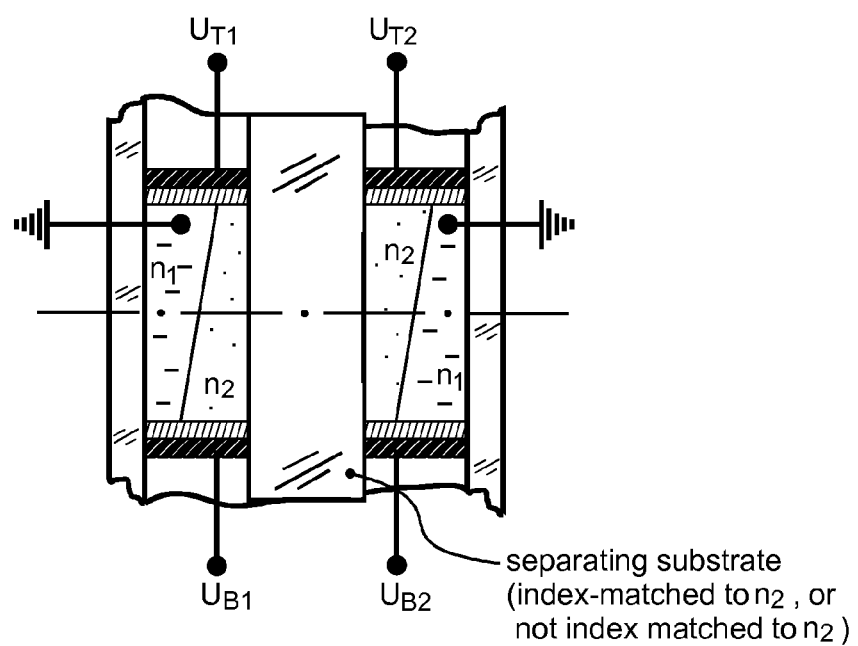
FIG. 18 shows an optical phase modulating element, using an electrowetting cell.

FIG. 18 is a cross-sectional view of a preferred example of an electrowetting cell with the objective of reducing the volume of the liquid to be moved when switching occurs, and reducing the distance the liquid has to move when switching occurs. A reduced volume of liquid to be moved, and a reduced distance to be moved, will reduce the switching time. This idea can be realised in both types of cells above, i.e. those according to the first example (FIG. 16) and those according to the second example (FIG. 17). Two sub-cells are disposed one after another, thus representing a phase-lagging pixel of a spatial light modulator. An optically transparent separating substrate is sandwiched between the two sub-cells in the centre of the cell. The separating substrate can preferably be index-matched to the refractive index of the surrounding liquid, so that there will be no loss of light caused by reflections. In the example according to FIG. 16, two liquids which differ in their optical properties are used, and in the example according to FIG. 17, at least two different liquids are used. The optical axes of the two sub-cells do not have to coincide, and preferably they exhibit a constant lateral offset. This constant lateral offset is preferred in order to reduce the dynamic part of the lateral shift, which would occur in the solution according to FIG. 16, in particular if the inclined plane plate is operated in a higher order for phase modulation. An example of a higher order for phase modulation is shown in FIG. 21C, where a phase shift between 0 and 2π can be achieved for values of γ between about 25 degrees and 34 degrees. What this means is that (referring to FIG. 21A), when the apex angle γ varies from 0° to 25°, a lateral shift from 0 to 10 microns will occur. On the other hand, if the apex angle varies from 25° to 34°, the lateral shift is in between 10 and 14 microns. In this case, it is preferred to choose a constant lateral offset (due to laterally shifted assembly of both cells, like a decentering) of say 12 microns. Then, the variable part of the lateral shift is reduced to plus/minus 2 microns.

In FIG. 18, and indeed more generally, what is desired is the ability to produce a phase shift between zero and $2\pi$ radians, and to achieve this by introducing a change to the tilt of the interface between two liquid layers which is relatively small, because the smaller the change in the tilt angle required to achieve a given phase shift, the faster the phase modulator should be. If the liquid interface, or a plane parallel plate, is tilted to start with (i.e. if there is a shifted lateral offset), then the additional tilt which has to be introduced to obtain the needed phase shift of up to $2\pi$ is smaller or much smaller than in the case of a non tilted initial state. That is why a pre tilted liquid cell is preferred. But if we have this large tilt in the initial state, we also have a large lateral shift in the beam propagation direction for a normally incident beam in the initial state of the device, because plane waves propagating normal to the cell will be propagating off-normal to the interfaces between the liquids and hence will experience refraction. For instance this lateral offset (i.e. the lateral deflection of a beam propagating normal to the cell, when traversing the cell), defining the zero position or initial state of the cell, may be 20 percent of the width of a cell, it is calculated. To correct for this, we arrange the second array of cells (of which the cell on the right hand side of FIG. 18 is an example) to compensate for the lateral offset of 20 percent of the width of a single cell. There is still a lateral offset $v(\gamma)$ in dependence on the introduced phase shift, and vice versa, but the dynamic range of the variable lateral shift is greatly reduced.

Figure 19:
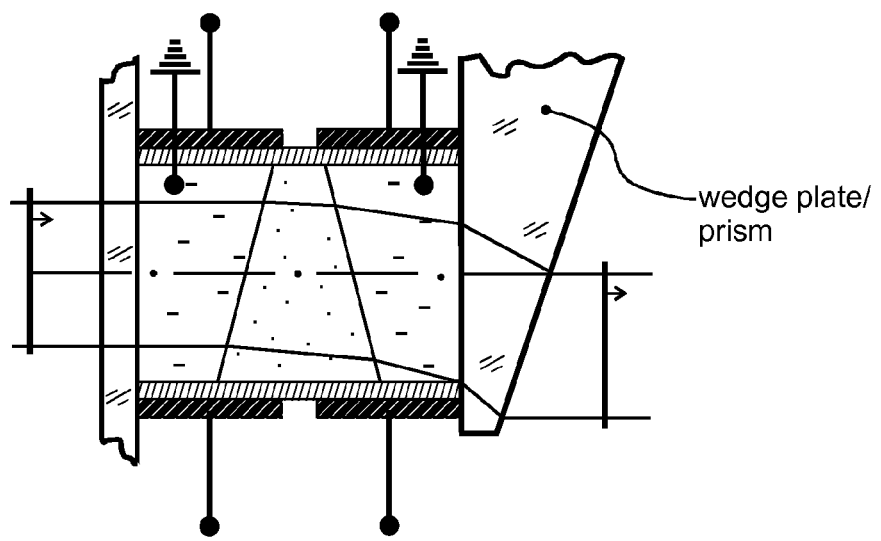
FIG. 19 shows an optical phase modulating element, using an electrowetting cell, with a prism for altering the beam propagation direction.

FIG. 19 shows an example where the fixed prism angle β, which occurs when realising the example shown in FIG. 17, is compensated for with the help of a fixed prism on the beam exit side of the device. Alternatively, the fixed prism may be on the beam entrance side of the device, as would be appreciated by one skilled in the art.

Figure 20:
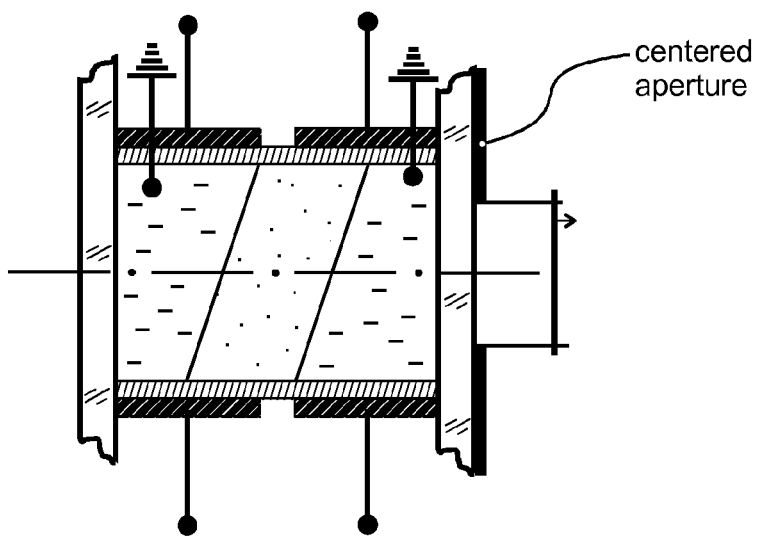
FIG. 20 shows an optical phase modulating element, using an electrowetting cell, with an aperture on the side from which the beam exits.

FIG. 20 shows an example which may be used to counteract the parallel offset of the beam, which occurs when realising the example shown in FIG. 17. In FIG. 20, light propagates from left to right. An aperture is disposed in a central position on the exit surface of the pixel, where said aperture is designed such that it is always completely illuminated. A part of the parallel-offset light wave is absorbed by the aperture. The exit surface of a pixel thus remains localised at the position of the aperture and is independent of the liquid interface inclination angle.

Figure 21:
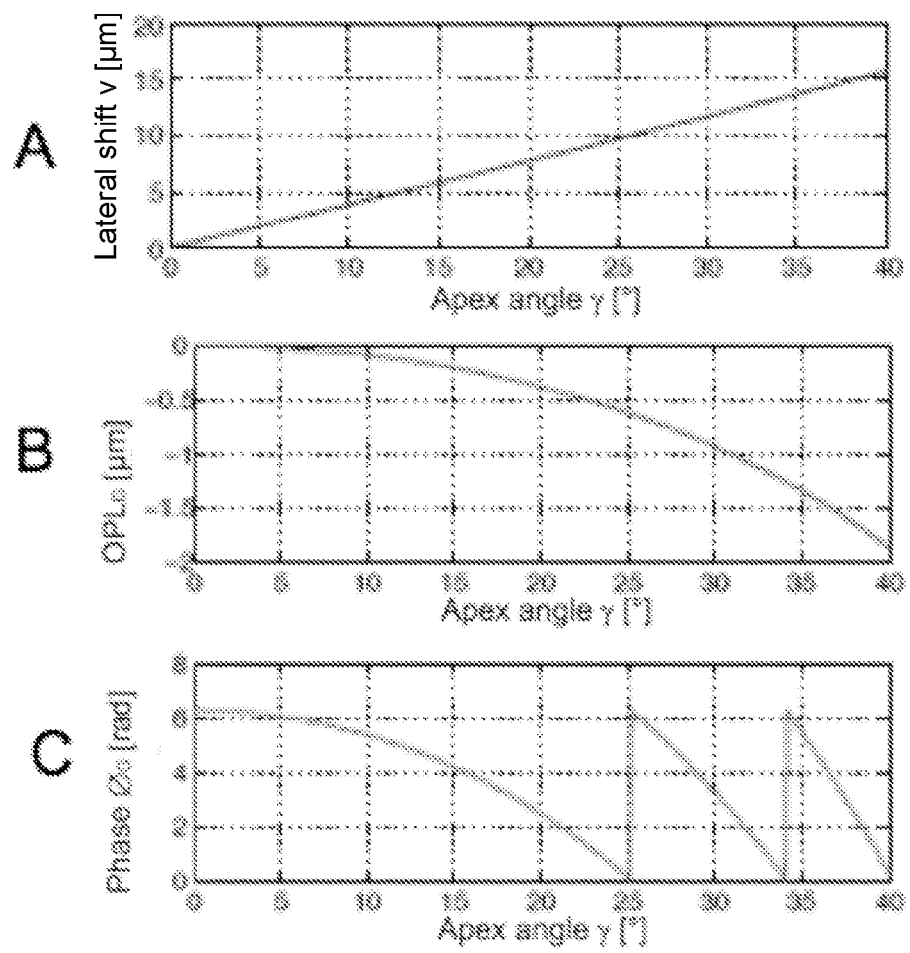
FIG. 21 A, B and C show the lateral beam offset or lateral shift of the beam, the optical path length difference and the phase lag, respectively, as a function of the inclination angle $\gamma$, calculated for the example shown in FIG. 16.

FIG. 21 A, B and C show the lateral beam offset or lateral shift of the beam, the optical path length difference and the phase lag, respectively, as a function of γ, calculated for the example shown in FIG. 16. Parameters used are: $n_1=n_3=1.33$; $n_2=1.6$, $h_b=130$ μm. In order to achieve a phase lag of $2\pi$, several inclination regimes are possible. For example, a $2\pi$ phase lag is achieved by an inclination within the range of $0°\leq\gamma\leq25°$ or within the range of $25°\leq\gamma\leq34°$. Because of the more favourable linearity and a smaller variable parallel offset, it is preferred to use a higher order, i.e. to define the initial state at a value of γ which is different from zero, such as in the range $25°\leq\gamma\leq34°$. The initial offset of the plane parallel shift can be compensated for by an equivalent but opposite plane parallel shift of the second sub-cell in respect to the first sub-cell, or by using an inclined cylindrical cavity which is filled with the liquids.

One skilled in the art will appreciate that phase modulation may be implemented on a pixel by pixel basis, and that a display may contain up to several million pixels, or more. The phase spatial modulator described may be used in a holographic display, especially in a holographic display in which the viewer views the holographic reconstruction through virtual observer windows. The phase spatial modulator described may also be used in a two dimensional phase modulating display, or in other applications in which phase modulating spatial light modulators are employed.

D. Complex Spatial Light Modulator and Display Device Using Electrowetting Cells and Display Device The spatial light modulators of parts A and C above may be combined to provide a complex spatial light modulator using electrowetting cells, which may be used in a display device. For complex modulation of a light wave, it is necessary to be able to modulate the amplitude and phase of a light wave independently. By using the spatial light modulators of parts A and C above in series, which respectively modulate the amplitude and the phase of a light wave, complex modulation of the light wave is enabled. The spatial light modulators of parts A and C above must be placed in sufficient proximity that cross-talk between pixels is zero or is kept to acceptable levels i.e. display artifacts which result are acceptably small for the viewer or viewers. The refresh rates which are aimed at lie in a range of between some hundred Hertz and some kHz i.e. the response time should be less than or equal to 5 ms, but typically greater than or equal to 100 microseconds. However, the spatial light modulator may also be operable at more conventional switching frequencies.

The modulator according to this implementation is thus not limited to the spectral range of the visible light, but includes the near infra red and near ultraviolet. For example, military applications in the near infra red are possible, such as in laser radar systems.

Figure 22:
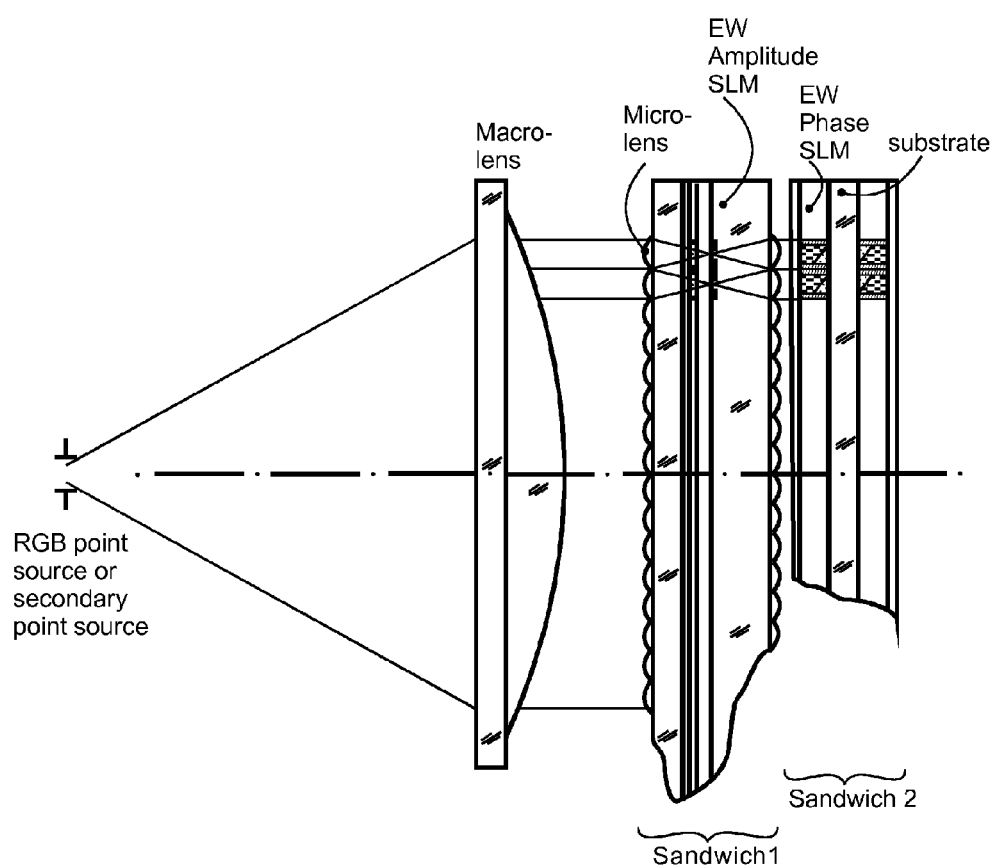
FIG. 22 shows an optical arrangement of a preferred embodiment of the present invention, wherein amplitude and phase modulation is sequentially applied.

FIG. 22 shows a schematic representation of an optical arrangement of a preferred embodiment of the present invention, wherein amplitude and phase modulation is sequentially applied. From the left to the right—in the direction of the propagation of the light—the following optical components are shown: a pinhole, a macro lens and a first and a second sandwich. The pinhole denotes a primary or secondary light source. The light source can be of a point-like or of a line-like shape. The macro lens comprises a spherical or a cylindrical shape, collimating the light emitted by the light source. The diameter or the cross sectional size of the macro lens can be in the range of several mm, for example 3 to 10 mm. The first sandwich comprises micro lenses on both surfaces perpendicular to the optical axis. The diameter or the cross sectional size of the micro lenses can be 20 to 100 μm, for example. The micro lenses comprise a spherical or a cylindrical shape. A micro lens of the left surface of the first sandwich as shown in FIG. 22 focuses the collimated light into an electrowetting cell. Such an electrowetting cell is comparable to an electrowetting cell as shown in FIGS. 1 to 3, i.e. it comprises a pinhole or a slit. The first sandwich comprises a plurality of such electrowetting cells being arranged next to each other in one or more directions forming a line type or a matrix type arrangement (below each other in the representation of FIG. 22, not shown). The first sandwich is operable such that it realises a SLM modulating the amplitude of the light directed towards the first sandwich. The light passing through the electrowetting cell—depending on its switching state being comparable to the ones shown in FIG. 1a to FIG. 1c—is collimated by the micro lens of the right surface of the first sandwich as shown in FIG. 22. The first sandwich can be spaced apart from the second sandwich by spacers (not shown) or the first sandwich can be in direct contact with the second sandwich. The order of the two sandwiches can be inverted. The second sandwich comprises a plurality of electrowetting cells being arranged next to each other in one or more directions forming a line type or a matrix type arrangement (below each other in the representation of FIG. 22, not shown). Light coming from an electrowetting cell of the first sandwich passes through an electrowetting cell of the second sandwich. The electrowetting cells of the second sandwich are of the type as shown in FIG. 18. The electrowetting cells of the second sandwich are operable such that they realises a SLM modulating the phase of the light directed through the second sandwich. The optical arrangement as shown in FIG. 22 can be seen as a cut-out of a display extending in vertical direction of FIG. 22 and therefore comprising more pinholes/light sources and more macro lenses, respectively. The light emitted by the pixels of this display can be modulated by the first and second sandwich in amplitude and/or in phase and thus can provide complex values. Such a display can be used as a hologram bearing medium of a holographic display into which a hologram is encoded in order to visualize a holographic representation of a three-dimensional scene. Such a holographic display is described for example in Appendix I. If light being emitted by the pixels of the display needs to be deflected, e.g. in order to realize eye tracking, an additional optical layer or sandwich can be added on the right hand side of the second sandwich (not shown in FIG. 22).

Figure 23:
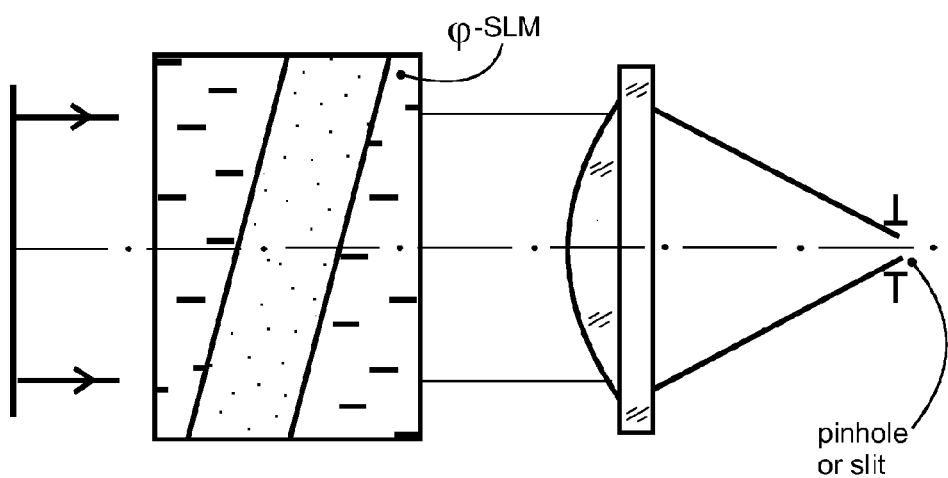
FIG. 23 shows a part of an optical arrangement of a preferred embodiment of the present invention, wherein a light source array can be provided, the single light sources of the light source array comprise variable/adjustable phase values.

FIG. 23 shows a schematic representation of a part of an optical arrangement of a preferred embodiment of the present invention, wherein a light source array can be provided. The single light sources of the light source array comprise variable/adjustable phase values. Collimated light coming from the left side passes through an electrowetting cell being adapted to modulate or alter the phase of the light passing through the electrowetting cell. The electrowetting cell is of the type as shown e.g. in FIGS. 16 to 20. The transmitted and still collimated light is focused by the spherical or cylindrical shaped lens into a pinhole or into a slit, respectively. The pinhole or slit light can be regarded as a single point or as a line light source—if light is passing through the pinhole or slit—whose phase can be altered depending on the control of the electrowetting cell. The optical arrangement as shown in FIG. 23 can be seen as a cut-out of an array of a plurality of light sources, electrowetting cells, lenses and pinholes being arranged in vertical direction of FIG. 23. The phase values of the light sources of this array can be modulated independently from each other.

Figure 24:
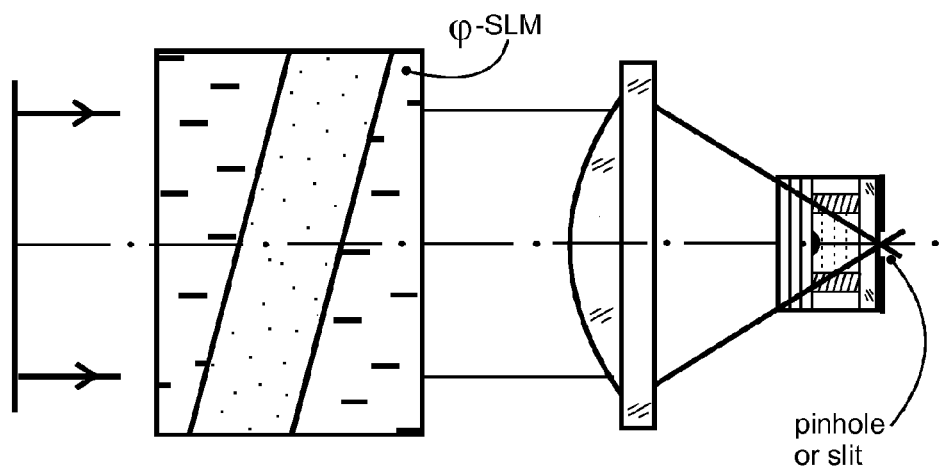
FIG. 24 shows a part of another optical arrangement of a preferred embodiment of the present invention, wherein a light source array can be provided, the single light sources of the light source array comprise variable/adjustable phase and amplitude values.

FIG. 24 shows a schematic representation of a part of another optical arrangement of a preferred embodiment of the present invention, wherein a light source array can be provided. The single light sources of the light source array comprise variable/adjustable phase and amplitude values. Collimated light coming from the left side passes through an electrowetting cell being adapted to modulate or alter the phase of the light passing through the electrowetting cell. The electrowetting cell is of the type as shown e.g. in FIGS. 16 to 20. The transmitted and still collimated light is focused by the spherical or cylindrical shaped lens into a second electrowetting cell comprising a pinhole or a slit, respectively. The second electrowetting cell can be one as shown in FIGS. 1 to 3. Therefore, the second electrowetting cell is adapted to modulate the amplitude of the light passing it in dependence of its switching state. The pinhole or slit of the second electrowetting cell can be regarded as a single point or line light source—if light is passing through the pinhole or slit—whose phase and/or amplitude can be altered depending on the control of the two electrowetting cells. The optical arrangement as shown in FIG. 24 can be seen as a cut-out of an array of a plurality of light sources, electrowetting cells and lenses being arranged in vertical direction of FIG. 24. The phase and/or amplitude values of the light sources of this array can be modulated independently from each other.

One skilled in the art will appreciate that complex modulation may be implemented on a pixel by pixel basis, and that a display may contain up to several million pixels, or more. The complex spatial modulator described may be used in a holographic display, especially in a holographic display in which the viewer views the holographic reconstruction through one or two virtual observer windows. The complex spatial modulator described may also be used in other applications, as would be obvious to one skilled in the art.

Notes

While the implementations have been illustrated and described in detail by the foregoing description in conjunction with the accompanying drawings, such illustration and description shall be considered illustrative and exemplary and not restrictive. The implementations shall not be limited to the disclosed examples. Other variations in the disclosed examples can be understood and effected by those skilled in the art in practicing the implementations, from a study of the drawings and the disclosure.

In the Figures herein, the relative dimensions shown are not necessarily to scale.

Various modifications and alterations of this invention will become apparent to those skilled in the art without departing from the scope of this invention, and it should be understood that this invention is not to be unduly limited to the illustrative examples and implementations set forth herein.

APPENDIX I

Technical Primer

The following section is meant as a primer to several key techniques used in some of the systems that implement the present invention.

In conventional holography, the observer can see a holographic reconstruction of an object (which could be a changing scene); his distance from the hologram is not however relevant. The reconstruction is, in one typical optical arrangement, at or near the image plane of the light source illuminating the hologram and hence is at the Fourier plane of the hologram. Therefore, the reconstruction has the same far-field light distribution of the real world object that is reconstructed.

One early system (described in WO 2004/044659 and US 2006/0055994) defines a very different arrangement in which the reconstructed object is not at or near the Fourier plane of the hologram at all. Instead, a virtual observer window zone is at the Fourier plane of the hologram; the observer positions his eyes at this location and only then can a correct reconstruction be seen. The hologram is encoded on a LCD (or other kind of spatial light modulator) and illuminated so that the virtual observer window becomes the Fourier transform of the hologram (hence it is a Fourier transform that is imaged directly onto the eyes); the reconstructed object is then the Fresnel transform of the hologram since it is not in the focus plane of the lens. It is instead defined by a near-field light distribution (modelled using spherical wavefronts, as opposed to the planar wavefronts of a far field distribution). This reconstruction can appear anywhere between the virtual observer window (which is, as noted above, in the Fourier plane of the hologram) and the LCD or even behind the LCD as a virtual object.

There are several consequences to this approach. First, the fundamental limitation facing designers of holographic video systems is the pixel pitch of the LCD (or other kind of light modulator). The goal is to enable large holographic reconstructions using LCDs with pixel pitches that are commercially available at reasonable cost. But in the past this has been impossible for the following reason. The periodicity interval between adjacent diffraction orders in the Fourier plane is given by $\lambda D/p$, where $\lambda$ is the wavelength of the illuminating light, D is the distance from the hologram to the Fourier plane and p is the pixel pitch of the LCD. But in conventional holographic displays, the reconstructed object is in the Fourier plane. Hence, a reconstructed object has to be kept smaller than the periodicity interval; if it were larger, then its edges would blur into a reconstruction from an adjacent diffraction order. This leads to very small reconstructed objects—typically just a few cm across, even with costly, specialised small pitch displays. But with the present approach, the virtual observer window (which is, as noted above, positioned to be in the Fourier plane of the hologram) need only be as large as the eye pupil. As a consequence, even LCDs with a moderate pitch size can be used. And because the reconstructed object can entirely fill the frustum between the virtual observer window and the hologram, it can be very large indeed, i.e. much larger than the periodicity interval. Further, where an OASLM is used, then there is no pixelation, and hence no periodicity, so that the constraint of keeping the virtual observer window smaller than a periodicity interval no longer applies.

There is another advantage as well, deployed in one variant. When computing a hologram, one starts with one's knowledge of the reconstructed object—e.g. you might have a 3D image file of a racing car. That file will describe how the object should be seen from a number of different viewing positions. In conventional holography, the hologram needed to generate a reconstruction of the racing car is derived directly from the 3D image file in a computationally intensive process. But the virtual observer window approach enables a different and more computationally efficient technique. Starting with one plane of the reconstructed object, we can compute the virtual observer window as this is the Fresnel transform of the object. We then perform this for all object planes, summing the results to produce a cumulative Fresnel transform; this defines the wave field across the virtual observer window. We then compute the hologram as the Fourier transform of this virtual observer window. As the virtual observer window contains all the information of the object, only the single-plane virtual observer window has to be transformed to the hologram and not the multi-plane object. This is particularly advantageous if there is not a single transformation step from the virtual observer window to the hologram but an iterative transformation like the Iterative Fourier Transformation Algorithm. Each iteration step comprises only a single Fourier transformation of the virtual observer window instead of one for each object plane, resulting in significantly reduced computation effort.

Another interesting consequence of the virtual observer window approach is that all the information needed to reconstruct a given object point is contained within a relatively small section of the hologram; this contrasts with conventional holograms in which information to reconstruct a given object point is distributed across the entire hologram. Because we need encode information into a substantially smaller section of the hologram, that means that the amount of information we need to process and encode is far lower than for a conventional hologram. That in turn means that conventional computational devices (e.g. a conventional digital signal processor (DSP) with cost and performance suitable for a mass market device) can be used even for real time video holography.

There are some less than desirable consequences however. First, the viewing distance from the hologram is important—the hologram is encoded and illuminated in such a way that only when the eyes are positioned at the Fourier plane of the hologram is the optimal reconstruction seen; whereas in normal holograms, the viewing distance is not important. There are however various techniques for reducing this Z sensitivity or designing around it, and in practice the Z sensitivity of the holographic reconstruction is usually not extreme.

Also, because the hologram is encoded and illuminated in such a way that optimal holographic reconstructions can only be seen from a precise and small viewing position (i.e. precisely defined Z, as noted above, but also X and Y co-ordinates), eye tracking may be needed. As with Z sensitivity, various techniques for reducing the X,Y sensitivity or designing around it exist. For example, as pixel pitch decreases (as it will with LCD manufacturing advances), the virtual observer window size will increase. Furthermore, more efficient encoding techniques (like Kinoform encoding) facilitate the use of a larger part of the periodicity interval as virtual observer window and hence the increase of the virtual observer window.

The above description has assumed that we are dealing with Fourier holograms. The virtual observer window is in the Fourier plane of the hologram, i.e. in the image plane of the light source. As an advantage, the undiffracted light is focused in the so-called DC-spot. The technique can also be used for Fresnel holograms where the virtual observer window is not in the image plane of the light source. However, care must be taken that the undiffracted light is not visible as a disturbing background. Another point to note is that the term transform should be construed to include any mathematical or computational technique that is equivalent to or approximates to a transform that describes the propagation of light. Transforms are merely approximations to physical processes more accurately defined by Maxwellian wave propagation equations; Fresnel and Fourier transforms are second order approximations, but have the advantages that (a) because they are algebraic as opposed to differential, they can be handled in a computationally efficient manner and (ii) can be accurately implemented in optical systems.

Further details are given in US patent application 2006-0138711, US 2006-0139710 and US 2006-0250671, the contents of which are incorporated by reference.

APPENDIX II

Glossary of Terms Used in the Description

Computer Generated Hologram

A computer generated video hologram CGH is a hologram that is calculated from a scene. The CGH may comprise complex-valued numbers representing the amplitude and phase of light waves that are needed to reconstruct the scene. The CGH may be calculated e.g. by coherent ray tracing, by simulating the interference between the scene and a reference wave, or by Fourier or Fresnel transform.

Encoding

Encoding is the procedure in which a spatial light modulator (e.g. its constituent cells, or contiguous regions for a continuous SLM like an OASLM) are supplied with control values of the video hologram. In general, a hologram comprises of complex-valued numbers representing amplitude and phase.

Encoded Area

The encoded area is typically a spatially limited area of the video hologram where the hologram information of a single scene point is encoded. The spatial limitation may either be realized by an abrupt truncation or by a smooth transition achieved by Fourier transform of a virtual observer window to the video hologram.

Fourier Transform

The Fourier transform is used to calculate the propagation of light in the far field of the spatial light modulator. The wave front is described by plane waves.

Fourier Plane

The Fourier plane contains the Fourier transform of the light distribution at the spatial light modulator. Without any focusing lens the Fourier plane is at infinity. The Fourier plane is equal to the plane containing the image of the light source if a focusing lens is in the light path close to the spatial light modulator.

Fresnel Transform

The Fresnel transform is used to calculate the propagation of light in the near field of the spatial light modulator. The wave front is described by spherical waves. The phase factor of the light wave comprises a term that depends quadratically on the lateral coordinate.

Frustum

A virtual frustum is constructed between a virtual observer window and the SLM and is extended behind the SLM. The scene is reconstructed inside this frustum. The size of the reconstructed scene is limited by this frustum and not by the periodicity interval of the SLM.

Imaging Optics

Imaging optics are one or more optical components such as a lens, a lenticular array, or a microlens array used to form an image of a light source (or light sources). References herein to an absence of imaging optics imply that no imaging optics are used to form an image of the one or two SLMs as described herein at a plane situated between the Fourier plane and the one or two SLMs, in constructing the holographic reconstruction.

Light System

The light system may include either of a coherent light source like a laser or a partially coherent light source like a LED. The temporal and spatial coherence of the partially coherent light source has to be sufficient to facilitate a good scene reconstruction, i.e. the spectral line width and the lateral extension of the emitting surface have to be sufficiently small.

Virtual Observer Window (VOW)

The virtual observer window is a virtual window in the observer plane through which the reconstructed 3D object can be seen. The VOW is the Fourier transform of the hologram and is positioned within one periodicity interval in order to avoid multiple reconstructions of the object being visible. The size of the VOW has to be at least the size of an eye pupil. The VOW may be much smaller than the lateral range of observer movement if at least one VOW is positioned at the observer's eyes with an observer tracking system. This facilitates the use of a SLM with moderate resolution and hence small periodicity interval. The VOW can be imagined as a keyhole through which the reconstructed 3D object can be seen, either one VOW for each eye or one VOW for both eyes together.

Periodicity Interval

The CGH is sampled if it is displayed on a SLM composed of individually addressable cells. This sampling leads to a periodic repetition of the diffraction pattern. The periodicity interval is $\lambda D/p$, where $\lambda$ is the wavelength, D the distance from the hologram to the Fourier plane, and p the pitch of the SLM cells. OASLMs however have no sampling and hence there is no periodic repetition of the diffraction pattern; the repetitions are in effect suppressed.

Reconstruction

The illuminated spatial light modulator encoded with the hologram reconstructs the original light distribution. This light distribution was used to calculate the hologram. Ideally, the observer would not be able to distinguish the reconstructed light distribution from the original light distribution. In most holographic displays the light distribution of the scene is reconstructed. In our display, rather the light distribution in the virtual observer window is reconstructed.

Scene

The scene that is to be reconstructed is a real or computer generated three-dimensional light distribution. As a special case, it may also be a two-dimensional light distribution. A scene can constitute different fixed or moving objects arranged in a space.

Spatial Light Modulator (SLM)

A SLM is used to modulate the wave front of the incoming light. An ideal SLM would be capable of representing arbitrary complex-valued numbers, i.e. of separately controlling the amplitude and the phase of a light wave. However, a typical conventional SLM controls only one property, either amplitude or phase, with the undesirable side effect of also affecting the other property.

The invention claimed is:

1. A spatial light modulator for modulating light field amplitude comprising a surface relief grating adapted to act as a diffractive lens, where a material is used to fill at least one groove of a surface grating structure, such that a controllable refractive index of the material inside the surface relief grating is controlled by an electric field, which leads to a controllable intensity at a fixed focal point of the diffractive lens.

2. The spatial light modulator of claim 1, in which the material is a liquid crystal, and the controllable refractive index is the controllable refractive index $n_{LC}$ of the liquid crystal or in which the material is an electro-optic material, and the controllable refractive index is the controllable refractive index of the electro-optic material.

3. The spatial light modulator of claim 1, in which the surface relief grating is a discontinuously or a continuously shaped surface relief structure.

4. The spatial light modulator of claim 1, in which contrast is enhanced using an aperture stop and in which a spherical lens or ball lens is used inside the aperture stop or in which contrast is enhanced using an aperture stop and an axicon or a variable axicon.

5. The spatial light modulator of claim 4, in which the axicon has one surface which is the surface of a lens.

6. The spatial light modulator of claim 1, in which the light modulation switching time is less than or equal to 5 ms and/or greater than or equal to 100 microseconds or in which the spatial light modulator is operable at conventional switching frequencies.

7. The spatial light modulator of claim 1, in which the spatial light modulator is used with sparse object reconstruction.

8. The spatial light modulator of claim 1, in which contrast is enhanced using a Fabry-Perot interferometer.

9. The spatial light modulator of claim 1, in which the spatial light modulator is used in a 3D display or in a holographic display or in a stereoscopic display or in which the spatial light modulator is used in a two dimensional amplitude modulating display.

10. The spatial light modulator of claim 9 in which one or two virtual observer windows for the eyes of one or more observers are used.

11. The spatial light modulator of claim 1, in which the modulated light is visible light and/or near infra red light and/or near ultraviolet light or in which the spatial light modulator is used in military applications, especially in laser radar systems.

12. The spatial light modulator of claim 1, in which the spatial light modulator is used to form a secondary light source or in which the spatial light modulator is used to form a light source array with variable amplitude.

13. The spatial light modulator of claim 1, in which the spatial light modulator is used in transmission or in a reflective geometry.

14. The spatial light modulator of claim 1 being combined with an additional spatial light modulator adapted to modulate the phase of light interacting with the additional spatial light modulator.

15. A display device which includes the spatial light modulator of claim 1.

16. The display device of claim 15, in which the display device has up to several million pixels.

17. The display device of claim 15, in which the display device contains a diffuser foil.

18. The display device of claim 15, in which the display device is a 2D phase modulating display device or a stereoscopic display device or in which the display device is a holographic display device and in which the holographic display device preferably uses virtual observer windows for the eyes of the observer or observers.

19. Method of using a display device of claim 1, the display including a light source and an optical system to illuminate the spatial light modulator; comprising the step of:
for each pixel, modulating the light field amplitude transmitted by each pixel using a surface relief grating which acts as a diffractive lens, where a material is used to fill the grooves of the surface grating structure, such that a controllable refractive index of the material inside the surface relief grating is controlled by an electric field.

* * * * *